(12) United States Patent
Baba et al.

(10) Patent No.: US 11,170,051 B2
(45) Date of Patent: Nov. 9, 2021

(54) INFORMATION PROCESSING DEVICE, INFORMATION PROCESSING METHOD, AND DIALOG CONTROL SYSTEM

(71) Applicant: FUJITSU LIMITED, Kawasaki (JP)

(72) Inventors: Takumi Baba, Kawasaki (JP); Takashi Imai, Atsugi (JP); Kei Taira, Kawasaki (JP); Miwa Okabayashi, Sagamihara (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/114,361

(22) Filed: Aug. 28, 2018

(65) Prior Publication Data

US 2019/0065623 A1 Feb. 28, 2019

(30) Foreign Application Priority Data

Aug. 30, 2017 (JP) .............................. JP2017-165209

(51) Int. Cl.
| | |
|---|---|
| G06F 16/9032 | (2019.01) |
| G10L 15/22 | (2006.01) |
| G06F 16/31 | (2019.01) |
| G06F 16/955 | (2019.01) |
| G06F 16/957 | (2019.01) |
| G10L 13/00 | (2006.01) |

(52) U.S. Cl.
CPC ...... *G06F 16/90332* (2019.01); *G06F 16/313* (2019.01); *G06F 16/955* (2019.01); *G06F 16/957* (2019.01); *G10L 15/22* (2013.01); *G10L 13/00* (2013.01); *G10L 2015/223* (2013.01); *G10L 2015/225* (2013.01)

(58) Field of Classification Search
CPC combination set(s) only.
See application file for complete search history.

(56) References Cited

U.S. PATENT DOCUMENTS

| | | | |
|---|---|---|---|
| 2002/0002462 A1 | 1/2002 | Tetsumoto | |
| 2002/0091524 A1* | 7/2002 | Guedalia | ................. G10L 13/08 704/260 |
| 2002/0178007 A1* | 11/2002 | Slotznick | ................. G09B 5/06 704/270.1 |
| 2002/0198720 A1* | 12/2002 | Takagi | .................... H04L 67/36 704/270.1 |
| 2004/0205614 A1* | 10/2004 | Keswa | .................... H04L 63/08 715/239 |

(Continued)

FOREIGN PATENT DOCUMENTS

| | | |
|---|---|---|
| JP | 11-110186 | 4/1999 |
| JP | 2000-181474 | 6/2000 |

(Continued)

OTHER PUBLICATIONS

JPOA—Office Action of Japanese Patent Application No. 2017-165209 dated May 18, 2021 with Full Machine Translation.

*Primary Examiner* — Linda Wong
(74) *Attorney, Agent, or Firm* — Fujitsu Patent Center

(57) ABSTRACT

An apparatus generates property data with a first context relation set between text display areas contained in a display image of a first webpage, and generates, based on the property data, dialog control data with a second context relation set between pieces of text extracted from structural elements of text display areas contained in a second webpage.

12 Claims, 41 Drawing Sheets

| PAGE URL | | | https://news.com/020 | | |
|---|---|---|---|---|---|
| SPEECH CONTENT ID | TEXT DATA | AREA NAME | SELECTION CONDITION | | LINK DESTINATION |
| | | | TRIGGER WORD | NEXT-SELECTED TARGET | |
| T1 | BABY BEAR'S VIDEO RELEASED | TITLE | "SUMMARY", "ROUGHLY" | T2 | – |
| | | | "SPECIFICALLY", "FULLY" | T3 | |
| T2 | ZOO RELEASED THE VIDEO OF A TWO-MONTH-OLD BABY BEAR. | OUTLINE | "SPECIFICALLY", "FULLY" | T3 | – |
| | | | "RELATED", "SIMILAR" | T4 | |
| T3 | ZOO SAYS THAT THE BABY BEAR HAS GROWN TO APPROXIMATELY XX cm IN LENGTH AND APPROXIMATELY XXXX g IN WEIGHT. IN THE RELEASED VIDEO, WE CAN SEE THE BABY BEAR HELD IN HIS MOTHER AND THRIVING. THE KEEPER SAYS, "THEY ARE BOTH IN GOOD CONDITION." | BODY | "RELATED", "SIMILAR" | T4 | – |
| | | | "TOPIC" | T1 | |
| T4 | FLOOD OF APPLICATIONS FOR NAMING BABY BEAR | RELATED NEWS | – | – | https://news.com/010 |

(56) References Cited

U.S. PATENT DOCUMENTS

2009/0248182 A1* 10/2009 Logan .............. H04N 21/44204
                                                                                                                                                               700/94
2009/0290694 A1* 11/2009 Busayapongchai ..........................
                                                                                                                                      H04M 3/4938
                                                                                                                                          379/88.18

FOREIGN PATENT DOCUMENTS

| | | |
|---|---|---|
| JP | 2002-091473 | 3/2002 |
| JP | 2004-303097 | 10/2004 |
| JP | 2008-171356 | 7/2008 |
| JP | 2012-027852 | 2/2012 |
| JP | 2013-218627 | 10/2013 |
| JP | 2015-502603 | 1/2015 |
| WO | 2013/070645 | 5/2013 |

* cited by examiner

FIG. 1

| | PAGE URL | | https://news.com/020 | | |
|---|---|---|---|---|---|
| SPEECH CONTENT ID | TEXT DATA | AREA NAME | SELECTION CONDITION | | LINK DESTINATION |
| | | | TRIGGER WORD | NEXT-SELECTED TARGET | |
| T1 | BABY BEAR'S VIDEO RELEASED | TITLE | "SUMMARY", "ROUGHLY" | T2 | — |
| | | | "SPECIFICALLY", "FULLY" | T3 | |
| T2 | ZOO RELEASED THE VIDEO OF A TWO-MONTH-OLD BABY BEAR. | OUTLINE | "SPECIFICALLY", "FULLY" | T3 | — |
| | | | "RELATED", "SIMILAR" | T4 | |
| T3 | ZOO SAYS THAT THE BABY BEAR HAS GROWN TO APPROXIMATELY XX cm IN LENGTH AND APPROXIMATELY XXXX g IN WEIGHT. IN THE RELEASED VIDEO, WE CAN SEE THE BABY BEAR HELD IN HIS MOTHER AND THRIVING. THE KEEPER SAYS, "THEY ARE BOTH IN GOOD CONDITION." | BODY | "RELATED", "SIMILAR" | T4 | — |
| | | | "TOPIC" | T1 | |
| T4 | FLOOD OF APPLICATIONS FOR NAMING BABY BEAR | RELATED NEWS | — | — | https://news.com/010 |

FIG. 3

| DOMAIN NAME | | news.com | |
|---|---|---|---|
| AREA NAME | TAG CONDITION | TRIGGER WORD | NEXT CANDIDATE |
| TITLE | Body > div#main > div#title | "TOPIC" | OUTLINE, BODY |
| OUTLINE | Body > div#main > div#abstract | "SUMMARY", "ROUGHLY" | BODY, RELATED NEWS |
| BODY | Body > div#main > div#detail | "SPECIFICALLY", "FULLY" | RELATED NEWS, TITLE |
| RELATED NEWS | Body > div#related | "RELATED", "SIMILAR" | — |

FIG. 27

| AREA NAME | TRIGGER WORD | NEXT CANDIDATE |
|---|---|---|
| TITLE | "TOPIC" | OUTLINE |
| OUTLINE | "SUMMARY", "ROUGHLY" | BODY |

FIG. 34

| SPEECH CONTENT ID | PAGE URL | | https://news.com/020 | | |
|---|---|---|---|---|---|
| | TEXT DATA | AREA NAME | SELECTION CONDITION | | LINK DESTINATION |
| | | | TRIGGER WORD | NEXT-SELECTED TARGET | |
| T1 | BABY BEAR'S VIDEO RELEASED | TITLE | "SUMMARY", "ROUGHLY" | T2 | – |
| | | | "SPECIFICALLY", "FULLY" | T3 | |
| T2 | ZOO RELEASED THE VIDEO OF A TWO-MONTH-OLD BABY BEAR. | OUTLINE | "SPECIFICALLY", "FULLY" | T3 | – |
| | | | "RELATED", "SIMILAR" | T5 | |
| T3 | ZOO SAYS THAT THE BABY BEAR HAS GROWN TO APPROXIMATELY XX cm IN LENGTH AND APPROXIMATELY XXXX g IN WEIGHT. IN THE RELEASED VIDEO, WE CAN SEE THE BABY BEAR HELD IN HIS MOTHER AND THRIVING. | BODY | "RELATED", "SIMILAR" | T5 | – |
| | | | "NEXT" | T4 | |
| T4 | THE KEEPER SAYS, "THEY ARE BOTH IN GOOD CONDITION." | BODY | "RELATED", "SIMILAR" | T5 | – |
| | | | "PREVIOUS" | T3 | |
| T5 | FLOOD OF APPLICATIONS FOR NAMING BABY BEAR | RELATED NEWS | – | – | https://news.com/010 |

INFORMATION PROCESSING DEVICE, INFORMATION PROCESSING METHOD, AND DIALOG CONTROL SYSTEM

CROSS-REFERENCE TO RELATED APPLICATION

This application is based upon and claims the benefit of priority of the prior Japanese Patent Application No. 2017-165209, filed on Aug. 30, 2017, the entire contents of which are incorporated herein by reference.

FIELD

The embodiments discussed herein are related to a technique that applies webpages to an automatic dialog.

BACKGROUND

Information in wide-ranging fields is allowed to be provided through hearing by reading out webpages automatically in an interactive manner, for example, with use of a news site providing numerous webpages.

Typically, webpages are created on the assumption that the webpages are to be displayed on a browser. When a displayed image contains multiple text display areas, a viewer considers the layout of areas, the size of characters, and others to intuitively grasp an area to read depending on his/her interest and proceed to read text.

On the other hand, in an automatic dialog in which text extracted from a webpage is automatically read out in machine turn, reading out the text in an improper order does not promote the understanding of a listener.

However, it is difficult for a person who creates control data for a dialog that reads out text extracted from a webpage to designate the order of reading in consideration of the understanding of a listener each time the person prepares for creating the control data for a dialog.

Japanese Laid-open Patent Publication Nos. 2013-218627, 2004-303097, and 2012-027852 and Japanese National Publication of International Patent Application No. 2015-502603 are examples of related art.

SUMMARY

According to an aspect of the invention, an apparatus generates property data with a first context relation set between text display areas contained in a display image of a first webpage, and generates, based on the property data, dialog control data with a second context relation set between pieces of text extracted from structural elements of text display areas contained in a second webpage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a configuration example of a dialog control table;
FIG. 3 is a diagram illustrating a configuration example of a property table;
FIG. 27 is a diagram illustrating an example of a preset table;
FIG. 34 is a diagram illustrating an example of the dialog control table in an embodiment 6.

DESCRIPTION OF EMBODIMENTS

It is preferable to easily prepare an automatic dialog using comparable webpages as an information source.

Embodiment 1

A dialog control table used in a user terminal for controlling an automatic dialog with a user will first be described. FIG. 1 illustrates a configuration example of the dialog control table. The dialog control table is an example of dialog control data containing content of a speech made by the user terminal (speech contents).

Figure 2:
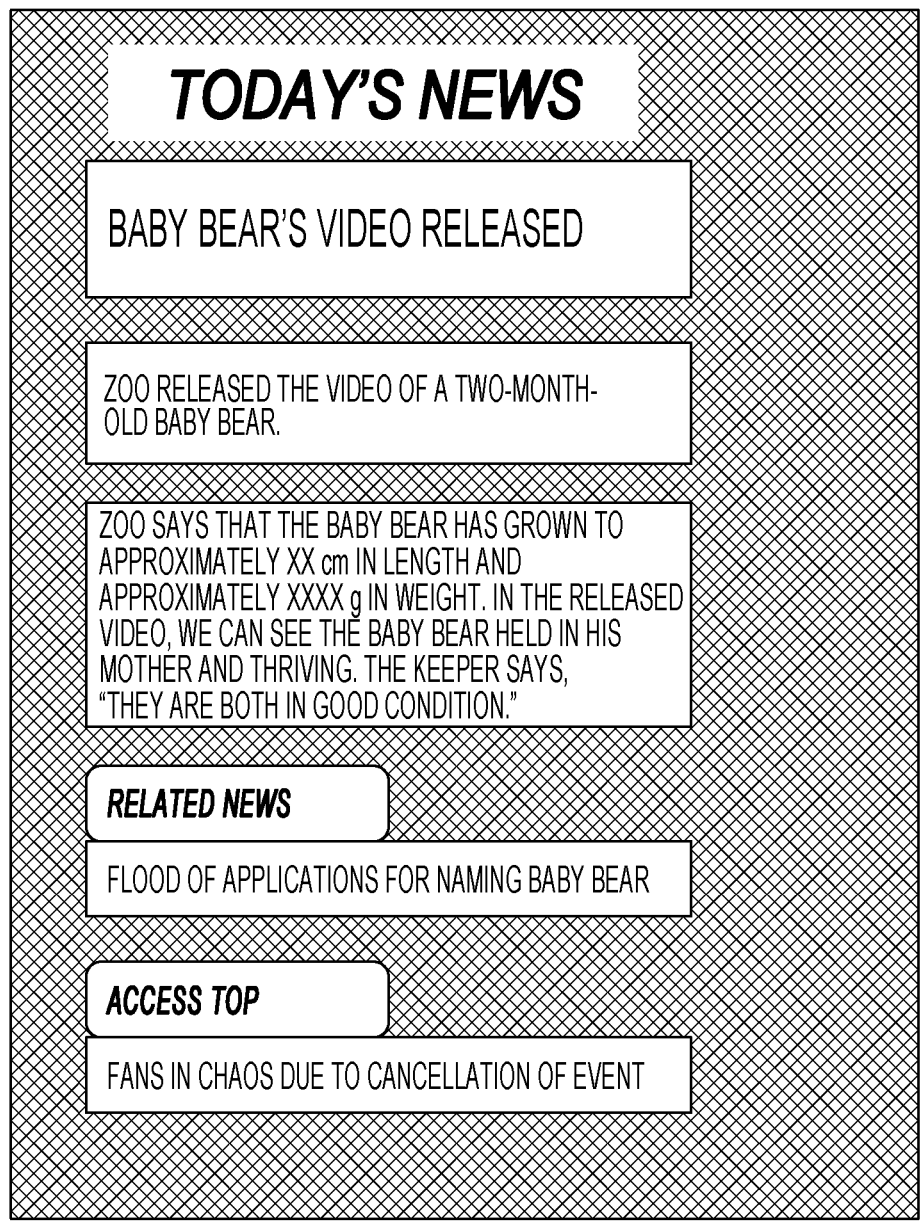
FIG. 2 is a diagram illustrating a display image example of a webpage.

The dialog control table includes a field to set a Uniform Resource Locator (URL) of a page to a header. The page URL indicates a storage location of a webpage that lays a base of the dialog control table. FIG. 2 illustrates a display image example of the webpage acquired from the page URL. Text is extracted from such a webpage and used as the speech content.

The dialog control table includes records associated with the speech content. Each record of the dialog control table includes a field with a speech content ID set, a field with text data set, a field with an area name set, a field with a selection condition set, and a field of link destination.

The speech content ID identifies speech content. The text data corresponds to the speech content. The area name is a name of an area to display text that is an extraction source of the text data. The selection condition is a condition for selecting the speech content in an automatic dialog. The field with the selection condition set contains a field with a trigger word set and a field of next-selected target.

The trigger word, which is expected to be contained in a speech made by the user, serves as a trigger to select speech content. The field of next-selected target contains a speech content ID specifying next text data to be read out in machine turn coming next to machine turn in which the text data is read out. To the field of link destination, a URL of a link destination, which is obtained when the text display area that is an extraction source is clicked, is set.

The first record depicted in FIG. 1 indicates that text data specified by a speech content ID: T1, "Baby bear's video released", is extracted from a text display area with an area name of a title. The first record further indicates that speech content of a speech content ID: T2 is selected in the next machine turn when a speech made by the user contains a trigger word of "summary" or "roughly" in an automatic dialog. That is, the user terminal outputs a voice of "Baby bear's video released" followed by the user speaking "roughly", and then the user terminal replies and utters the sentence of "Zoo released the video of a two-month-old baby bear".

The above-described dialog control table is generated by referring to the webpage as well as a table indicating properties of the webpage. FIG. 3 illustrates a configuration example of a property table. The property table is an example of property data. The property table includes a field to set a domain name to a header. The domain name specifies a site providing the webpage. That is, the property table is applied to a webpage acquired from a URL containing the domain name concerned.

The property table includes records associated with the text display areas from which the speech content is extracted. Each record of the property table includes a field with the area name set, a field with the tag condition set, a field with the trigger word set, and a field of next candidate.

The area name is a name of an area to display text that is a source of the speech content to be extracted. The tag condition is specified by a structural element relevant to the text display area, in other words, a hierarchical tag separating a description section in a structured document. The trigger word is a word serving as a trigger to output, with a voice, the text data extracted from the text display area. To the field of next candidate, a name of a text display area is set that is a source of next speech content to be selected in machine turn coming next to the voice output of the text data.

The first record illustrated in FIG. 3 indicates that a structural element specified by the tag, Body>div #main>div #title, is a description section relevant to a text display area with a name of a title. The first record further indicates that the text data extracted from this text display area is appropriate for voice output subsequent to a user's speech containing a word of "topic". Moreover, the first record indicates an expectation that content extracted from this text display area is uttered, and then proceeds to speech content extracted from a text display area of an outline or speech content extracted form a text display area of a body.

Figure 4:
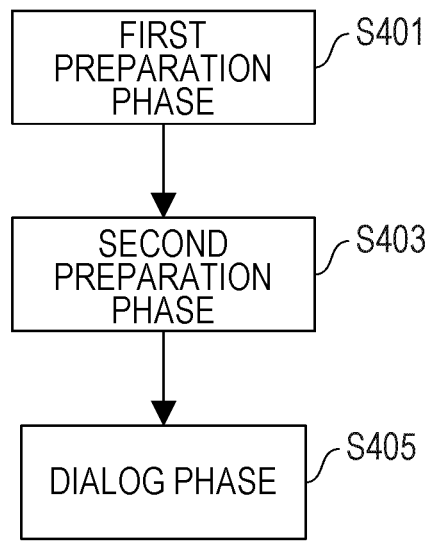
FIG. 4 is a diagram illustrating phases.
Figure 5:
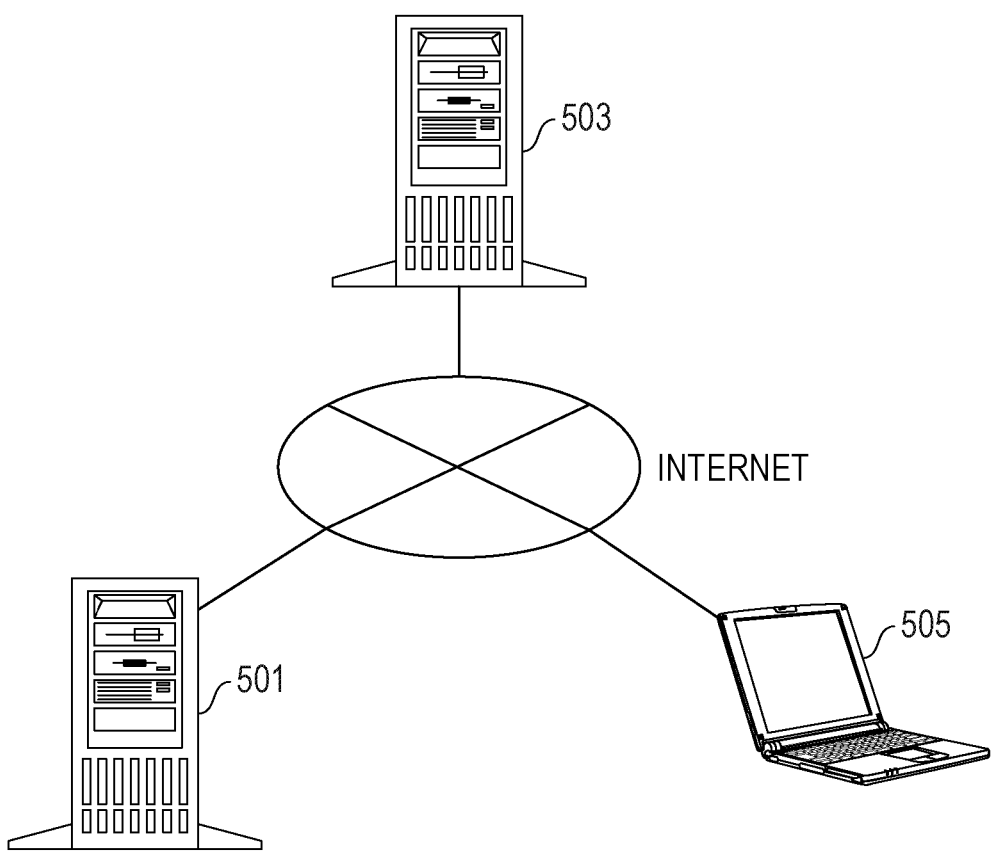
FIG. 5 is a diagram illustrating a network configuration example.

FIG. 4 illustrates phases in the present embodiment. FIG. 5 illustrates a network configuration example. In this example, a dialog server 501, a Web server 503, and a user terminal 505 each are connected to the Internet.

In a first preparation phase (S401), the dialog server 501 performs a first preparation process. In the first preparation process, the above-described property table (FIG. 3) is generated. The first preparation process is activated when a site to be used is newly set. Alternatively, the first preparation process may be activated when a data update in a target site is detected, or may be activated periodically.

In a second preparation phase (S403), the dialog server 501 performs a second preparation process. In the second preparation phase, the above-described dialog control table (FIG. 1) is generated. The second preparation phase (S403) may directly follow the first preparation phase (S401) or may not follow the first preparation phase (S401). The second preparation process may be activated when a data update in a target site is detected. Alternatively, the second preparation process may be activated periodically, or may be activated immediately before a dialog phase (S405).

In the dialog phase (S405), the user terminal 505 acquires the dialog control table (FIG. 1) from the dialog server 501 and performs an automatic dialog with a user.

Figure 6:
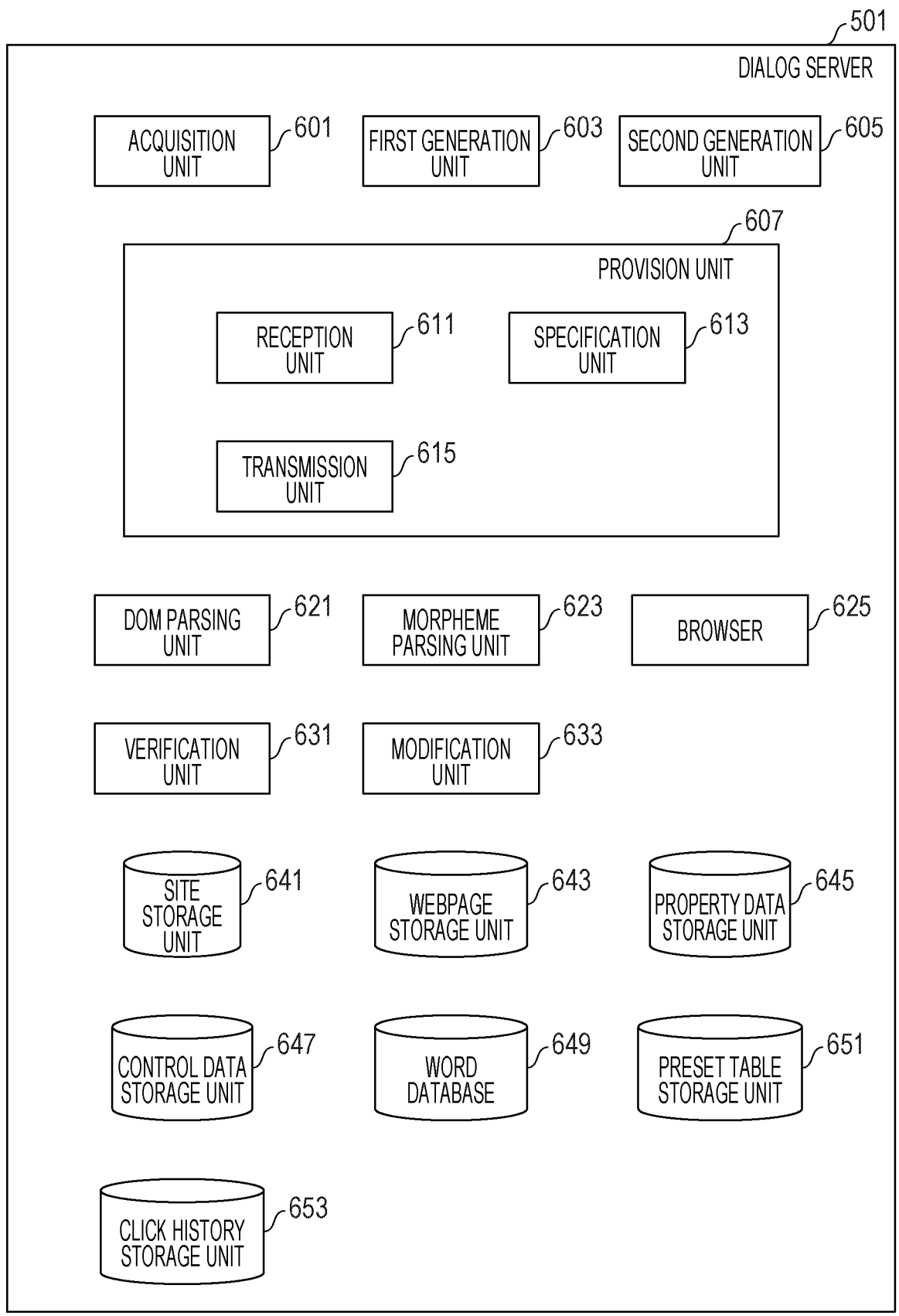
FIG. 6 is a diagram illustrating a module configuration example of a dialog server.

FIG. 6 illustrates a module configuration example of the dialog server 501. The dialog server 501 includes an acquisition unit 601, a first generation unit 603, a second generation unit 605, and a provision unit 607.

The acquisition unit 601 acquires the webpage in the site. The acquisition unit 601 may use Web scraping technology. The first generation unit 603 generates the property table. The second generation unit 605 generates the dialog control table. The provision unit 607 provides the dialog control table to the user terminal 505. The provision unit 607 has a reception unit 611, a specification unit 613, and a transmission unit 615. The reception unit 611 receives a request for the dialog control table from the user terminal 505. The specification unit 613 specifies the dialog control table in response to the request. The transmission unit 615 transmits the dialog control table to the user terminal 505.

The dialog server 501 further includes a document object model (DOM) parsing unit 621, a morpheme parsing unit 623, and a browser 625. The DOM parsing unit 621 performs a DOM parsing process. The morpheme parsing unit 623 performs a morpheme parsing process. The browser 625 is used to parse a structured document and display an image thereon.

The dialog server 501 further includes a verification unit 631 and a modification unit 633. The verification unit 631 checks the generated dialog control table and determines whether the generation of the dialog control table fails. The modification unit 633 modifies the property table.

The dialog server 501 further includes a site storage unit 641, a webpage storage unit 643, a property data storage unit 645, a control data storage unit 647, a word database 649, a preset table storage unit 651, and a click history storage unit 653. The site storage unit 641 stores therein the domain name of the site targeted for website acquisition. The webpage storage unit 643 stores therein the webpage. The property data storage unit 645 stores therein the property table. The control data storage unit 647 stores therein the dialog control table. The word database 649 provides data on relevance between words, a feature degree of a word, classification of words, and so on. The preset table storage unit 651 stores therein a preset table. The preset table will be described later using FIG. 27. The click history storage unit 653 stores therein a history of clicks (click history) made on the text display area.

The acquisition unit 601, the first generation unit 603, the second generation unit 605, the provision unit 607, the reception unit 611, the specification unit 613, the transmission unit 615, the DOM parsing unit 621, the morpheme parsing unit 623, the verification unit 631, and the modification unit 633, which are described above, are implemented by using a hardware resource (FIG. 40, for example) and a program causing, for example, a central processing unit (CPU) to execute the below-described processes.

Figure 40:
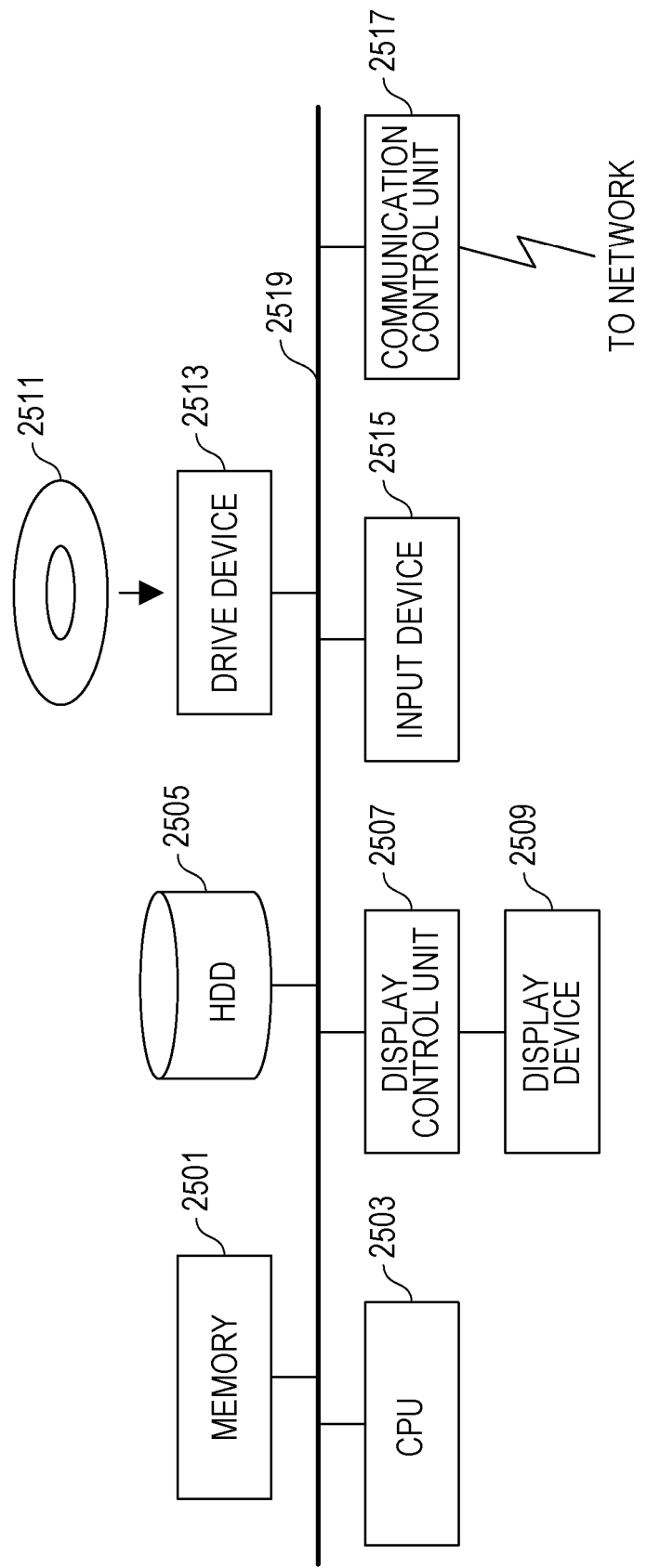
FIG. 40 is a functional block diagram of a computer.

The site storage unit 641, the webpage storage unit 643, the property data storage unit 645, the control data storage unit 647, the word database 649, the preset table storage unit 651, and the click history storage unit 653, which are described above, are implemented by using a hardware resource (FIG. 40, for example).

Figure 7:
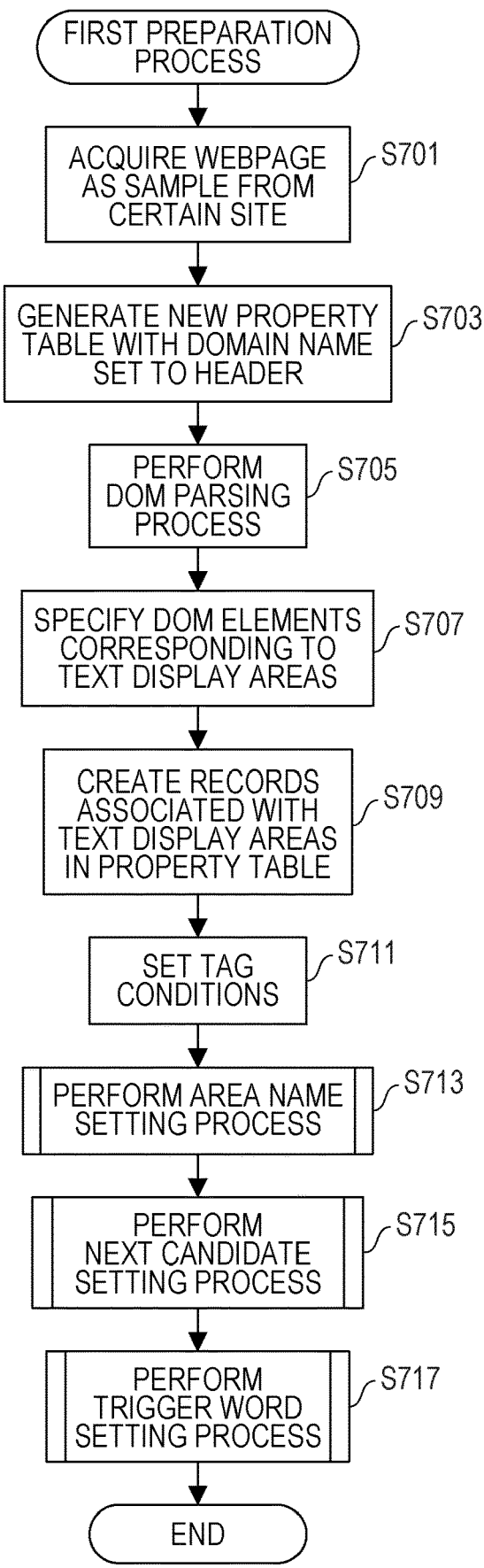
FIG. 7 is a diagram illustrating a first preparation process flow.

The first preparation process will next be described. FIG. 7 illustrates a first preparation process flow. The acquisition unit 601 acquires a webpage as a sample from a certain site based on a domain name stored in the site storage unit 641 (S701). The webpage to be a sample is freely selected. The webpage is assumed to be in a form of a structured document such as a Hypertext Markup Language (HTML) document and an Extensible Markup Language (XML) document.

The first generation unit 603 generates a new property table with the domain name set to a header (S703). At this stage, no record is created in the property table.

The first generation unit 603 causes the DOM parsing unit 621 to perform the DOM parsing process (S705). In the DOM parsing process relevant to the webpage, the DOM parsing unit 621 specifies DOM elements contained in the webpage in the form of a structured document, based on structured tags. The DOM element is an example of the structural element.

The first generation unit 603 specifies DOM elements (structural element containing a description relevant to text display) corresponding to text display areas (S707). The first generation unit 603 then creates records associated with the text display areas in the property table (S709).

The first generation unit 603 sets tag conditions specifying the structural elements to the records (S711). The first generation unit 603 then performs an area name setting process (S713). In the area name setting process, the first generation unit 603 sets area names to the records created in S709.

Figure 8:
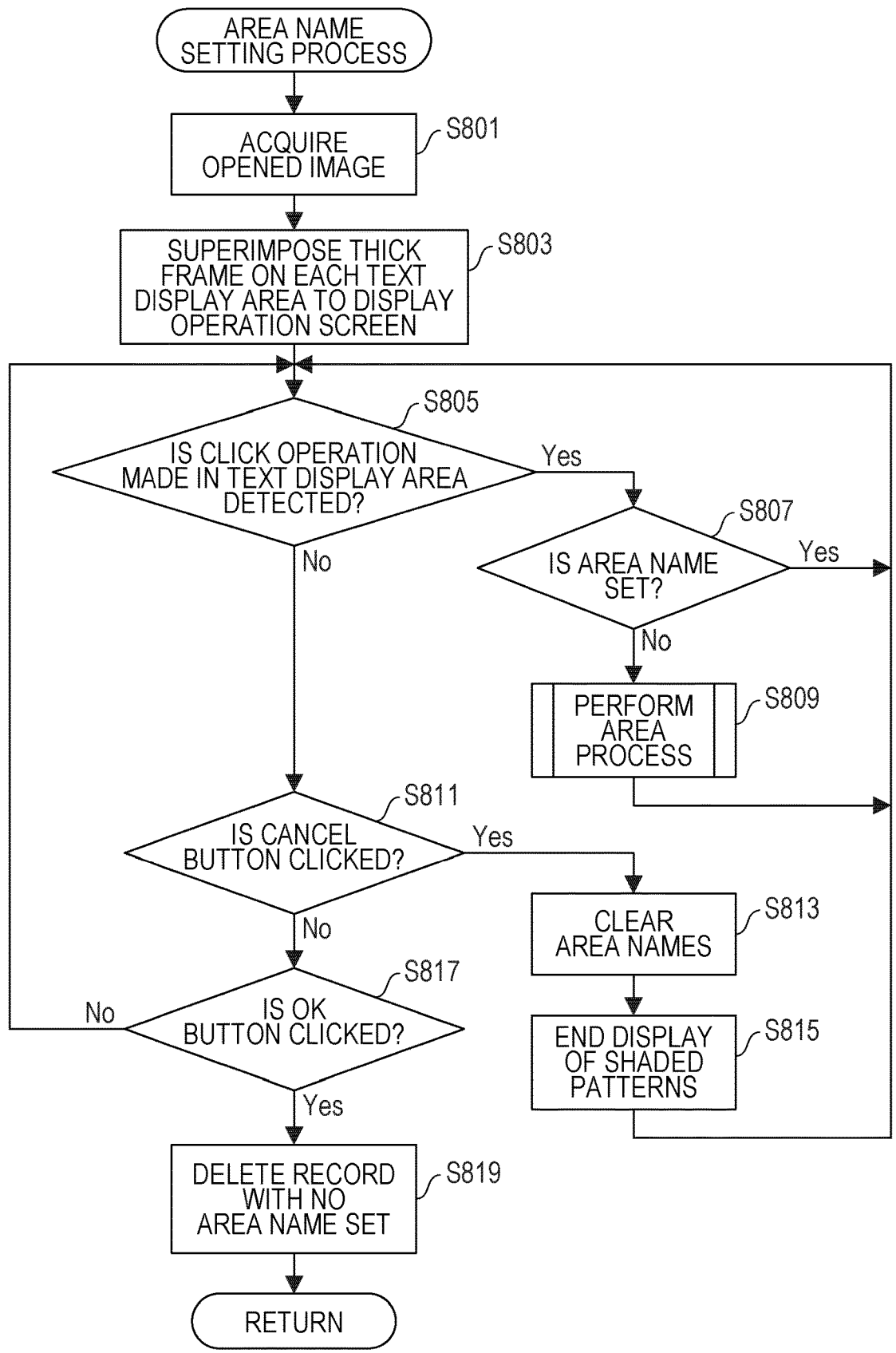
FIG. 8 is a diagram illustrating an area name setting process flow.
Figure 9:
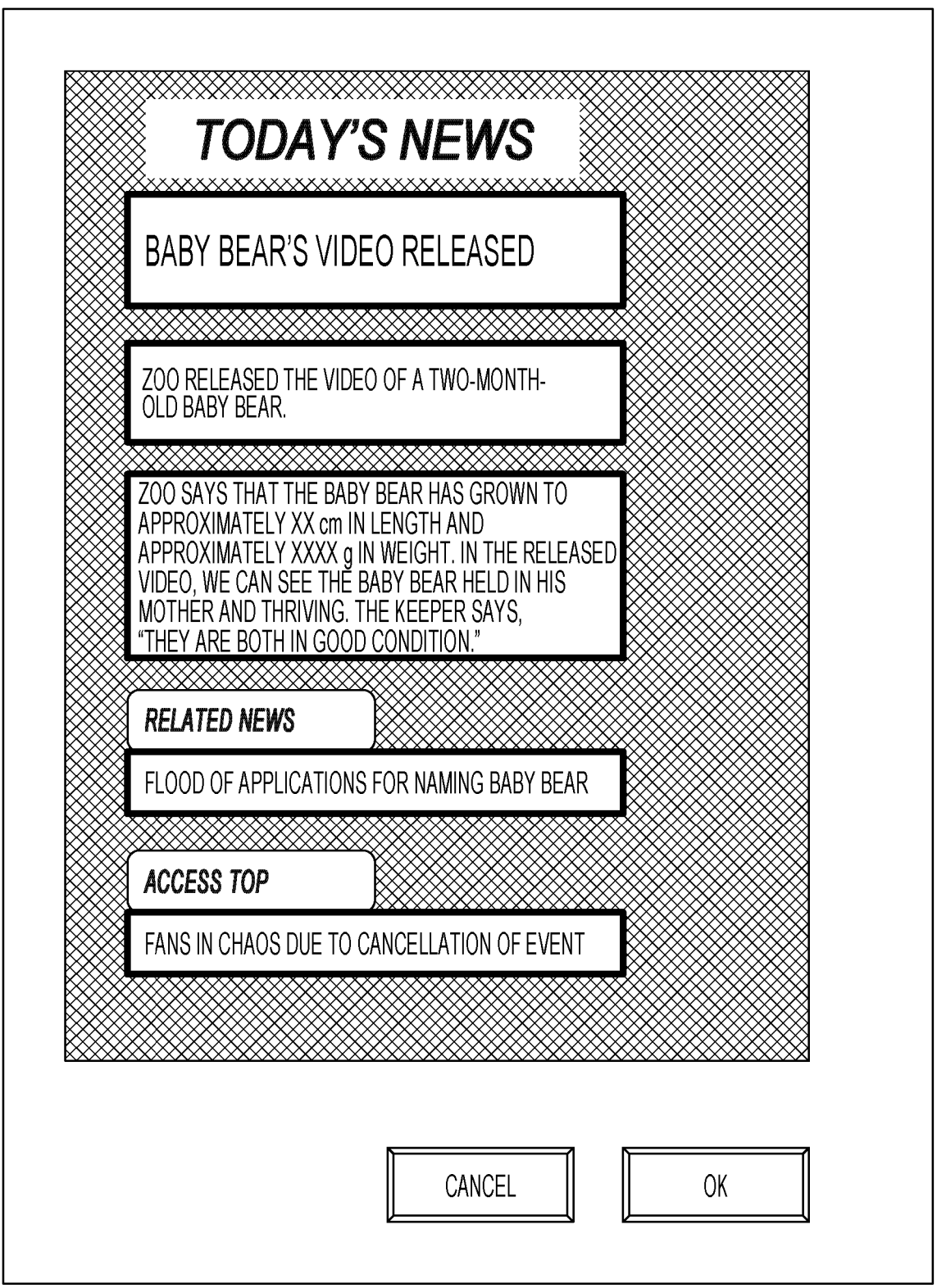
FIG. 9 is a diagram illustrating an operation screen example.

FIG. 8 illustrates an area name setting process flow. The first generation unit 603 acquires an image of the opened webpage through the browser 625 (S801). The first generation unit 603 superimposes a thick frame on each text display area in the image and displays an operation screen (S803). FIG. 9 illustrates an example of the thus displayed operation screen.

The first generation unit 603 determines whether a click operation made in a text display area is detected (S805). If determining that a click operation made in a text display area is detected, the first generation unit 603 determines whether an area name is set to a record associated with the text display area (S807). If it is determined that an area name has already been set to the record associated with the text display area, the process goes back to the process of S805.

On the other hand, if determining that an area name has not yet been set to the record associated with the text display area, the first generation unit 603 performs an area process (S809). In the area process, the first generation unit 603 accepts an area name relevant to the clicked text display area.

Figure 10:
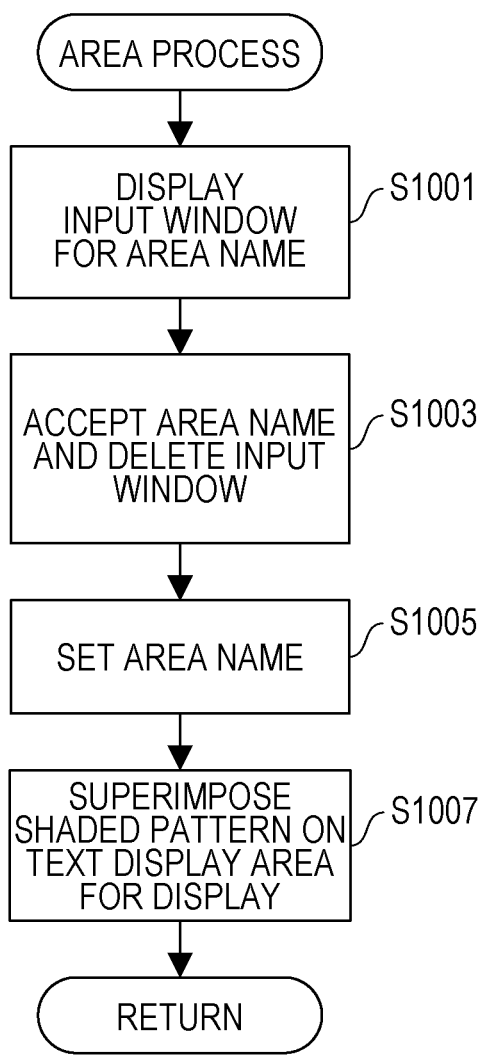
FIG. 10 is a diagram illustrating an area process flow.
Figure 11:
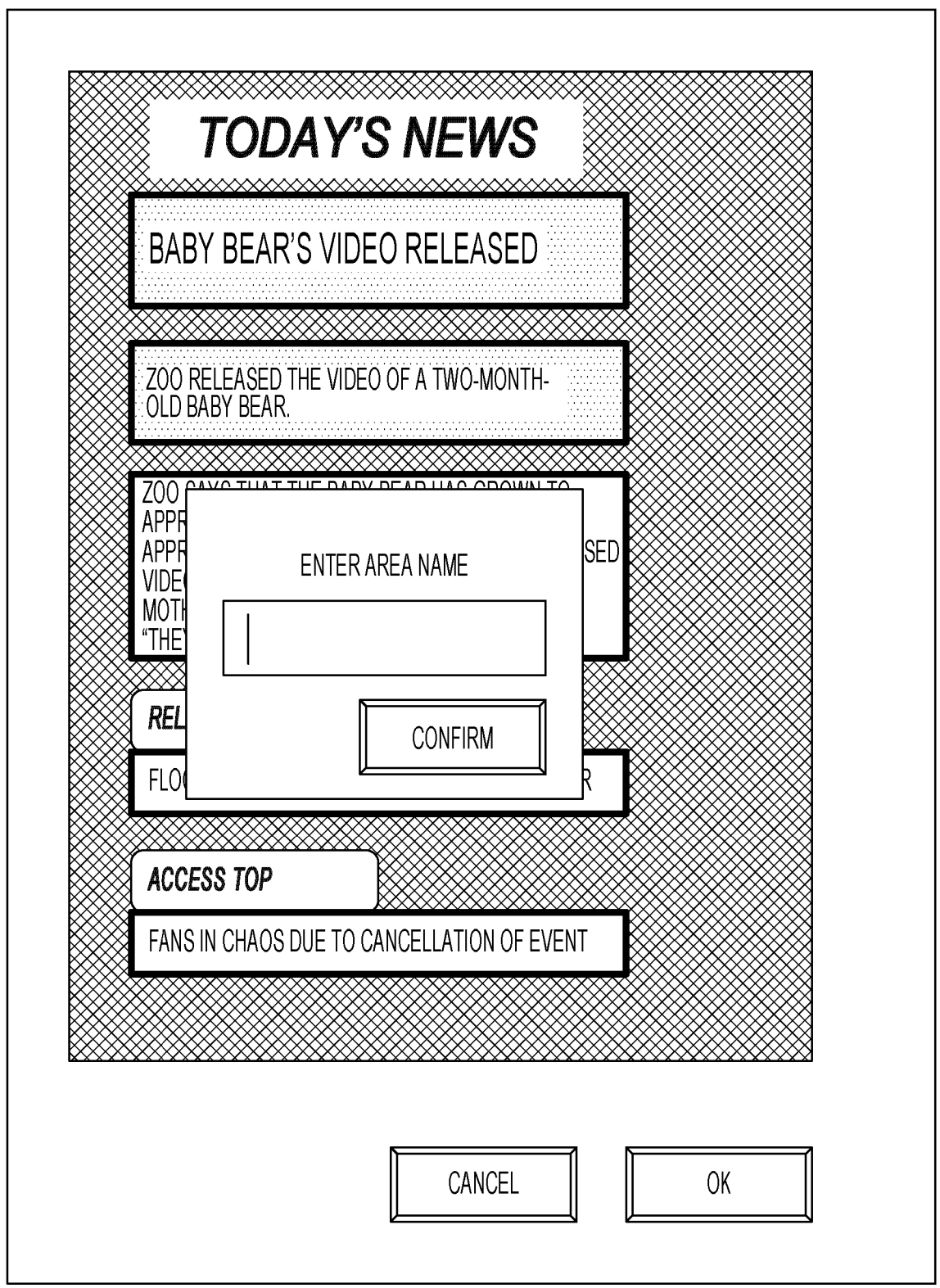
FIG. 11 is a diagram illustrating an example of an input window for an area name.

FIG. 10 illustrates an area process flow. The first generation unit 603 displays an input window for the area name (S1001). FIG. 11 illustrates an example of the input window for the area name.

The first generation unit 603 accepts an area name input through a user operation and deletes the input window (S1003). The first generation unit 603 sets the accepted area name to the record associated with the text display area (S1005). The first generation unit 603 then superimposes a shaded pattern on the text display area for display (S1007). The area process ends and the process returns to the area name setting process that is a calling source.

The description goes back to FIG. 8. The area process ends and the process goes back to the process of S805.

If determining that a click operation made in a text display area is not detected in S805, on the other hand, the first generation unit 603 determines whether a cancel button is clicked (S811). If determining that the cancel button is clicked, the first generation unit 603 clears the area names set to the property table (S813) and ends the display of the shaded patterns (S815). The process then goes back to the process indicated in S805 and repeats the above-described processes.

On the other hand, if determining that the cancel button is not clicked, the first generation unit 603 determines whether an OK button is clicked (S817). If it is determined that the OK button is not clicked, the process goes back to the process indicated in S805 and repeats the above-described processes.

On the other hand, if determining that the OK button is clicked, the first generation unit 603 deletes a record with no area name set (S819). Hereinafter, the text display areas with the area name set will be dealt with as selected as a target for extracting speech content, while the other text display areas will be dealt with as not selected as a target for extracting speech content.

The area name setting process ends and the process returns to the first preparation process that is a calling source.

The description goes back to FIG. 7. The first generation unit 603 performs a next candidate setting process (S715). In the next candidate setting process, the first generation unit 603 sets area names of the next candidate to the records created in S709.

Figure 12:
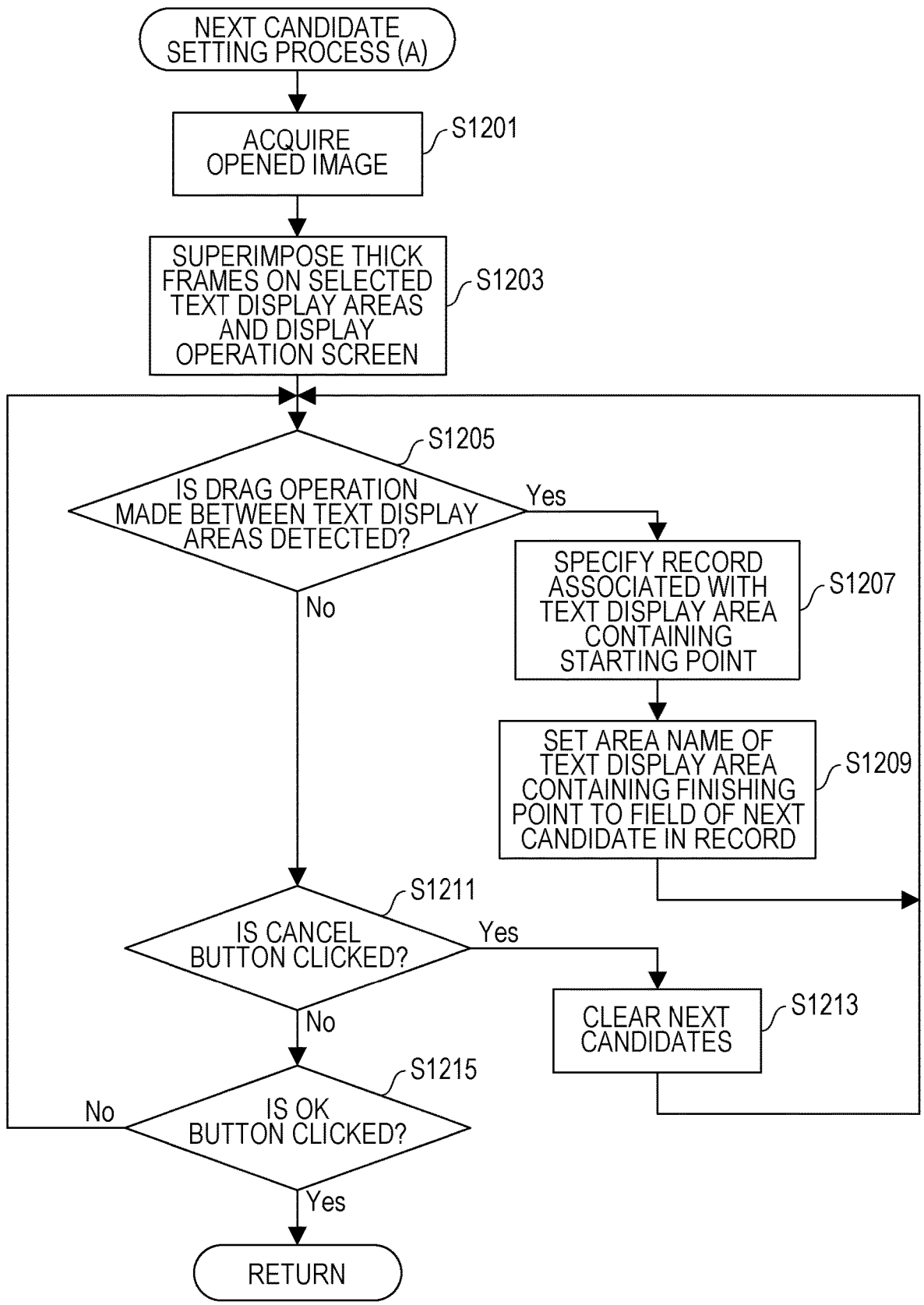
FIG. 12 is a diagram illustrating a next candidate setting process (A) flow.

In the present embodiment, a next candidate setting process (A) is performed. FIG. 12 illustrates a next candidate setting process (A) flow. The first generation unit 603 acquires the image of the opened webpage (S1201). The first generation unit 603 then superimposes thick frames on text display areas selected earlier of the text display areas contained in the image and displays an operation screen (S1203). To use the operation screen displayed earlier, the processes of S1201 and S1203 may be omitted.

Figure 13:
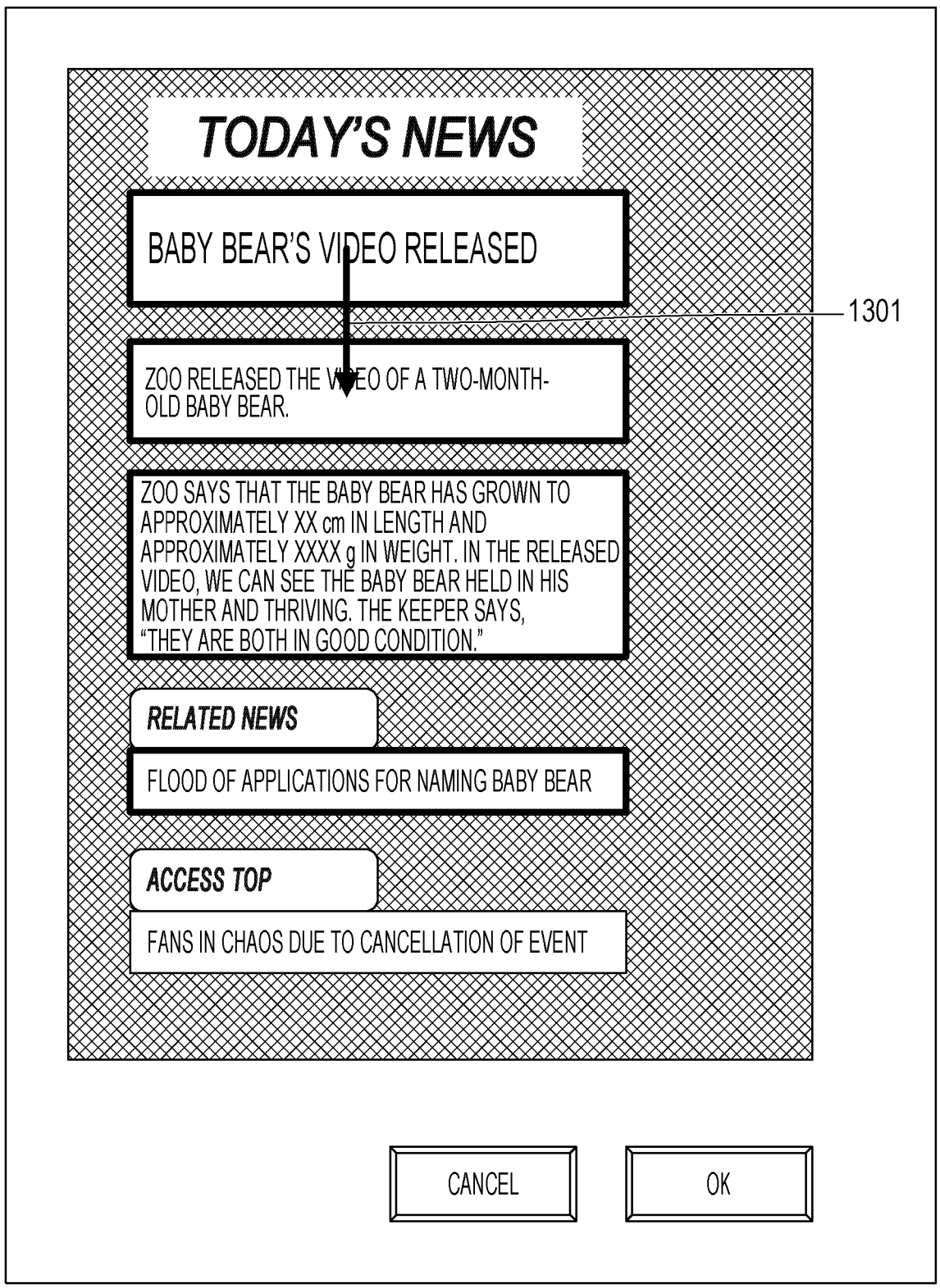
FIG. 13 is a diagram illustrating an example of a drag operation made between text display areas.

The first generation unit 603 determines whether a drag operation from a text display area to another text display area is detected (S1205). FIG. 13 illustrates an example of a drag operation between text display areas. An arrow 1301 depicts a trajectory of detected points of the drag operation. In this example, the first text display area contains a starting point and the second text display area contains a finishing point.

If determining that a drag operation between text display areas is detected, the first generation unit 603 specifies a record associated with the text display area containing the starting point (S1207). The first generation unit 603 then sets an area name of the text display area containing the finishing point to the field of next candidate in the record (S1209).

On the other hand, if determining that a drag operation between text display areas is not detected in S1205, the first generation unit 603 determines whether the cancel button is clicked (S1211). If determining that the cancel button is clicked, the first generation unit 603 clears the next candidates set to the property table (S1213). The process then goes back to the process indicated in S1205 and repeats the above-described processes.

On the other hand, if determining that the cancel button is not clicked, the first generation unit 603 determines whether the OK button is clicked (S1215). If it is determined that the OK button is not clicked, the process goes back to the process indicated in S1205 and repeats the above-described processes. On the other hand, if it is determined that the OK button is clicked, the next candidate setting process (A) ends and the process returns to the first preparation process that is a calling source.

The description goes back to FIG. 7. The first generation unit 603 performs a trigger word setting process (S717). In the trigger word setting process, the first generation unit 603 sets trigger words to the records created in S709.

Figure 14:
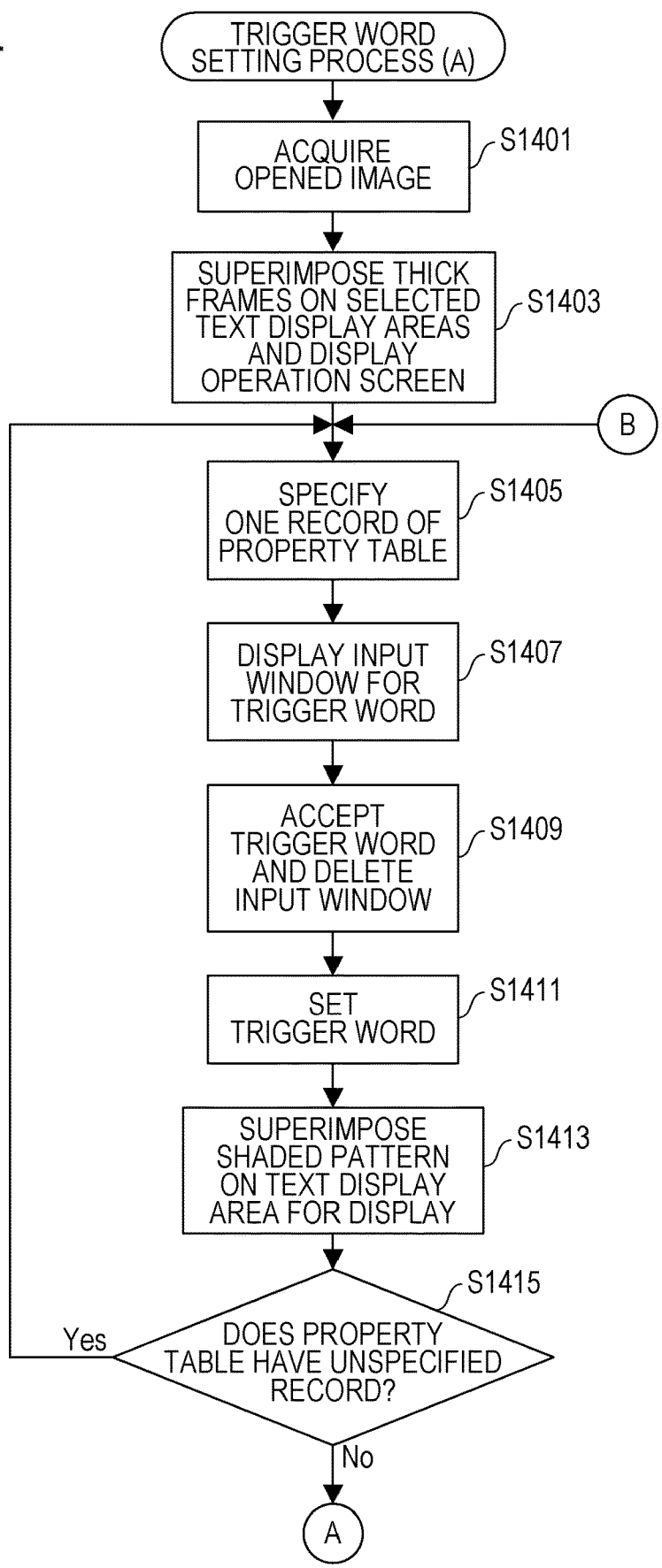
FIG. 14 is a diagram illustrating a trigger word setting process (A) flow.

In the present embodiment, a trigger word setting process (A) is performed. FIG. 14 illustrates a trigger word setting process (A) flow. The first generation unit 603 acquires the image of the opened webpage (S1401). The first generation unit 603 then superimposes thick frames on selected text display areas of the text display areas contained in the image and displays an operation screen (S1403). To use the operation screen displayed earlier, the processes of S1401 and S1403 may be omitted.

The first generation unit 603 specifies one record of the property table (S1405). For example, the first generation unit 603 specifies records one by one from the top.

Figure 15:
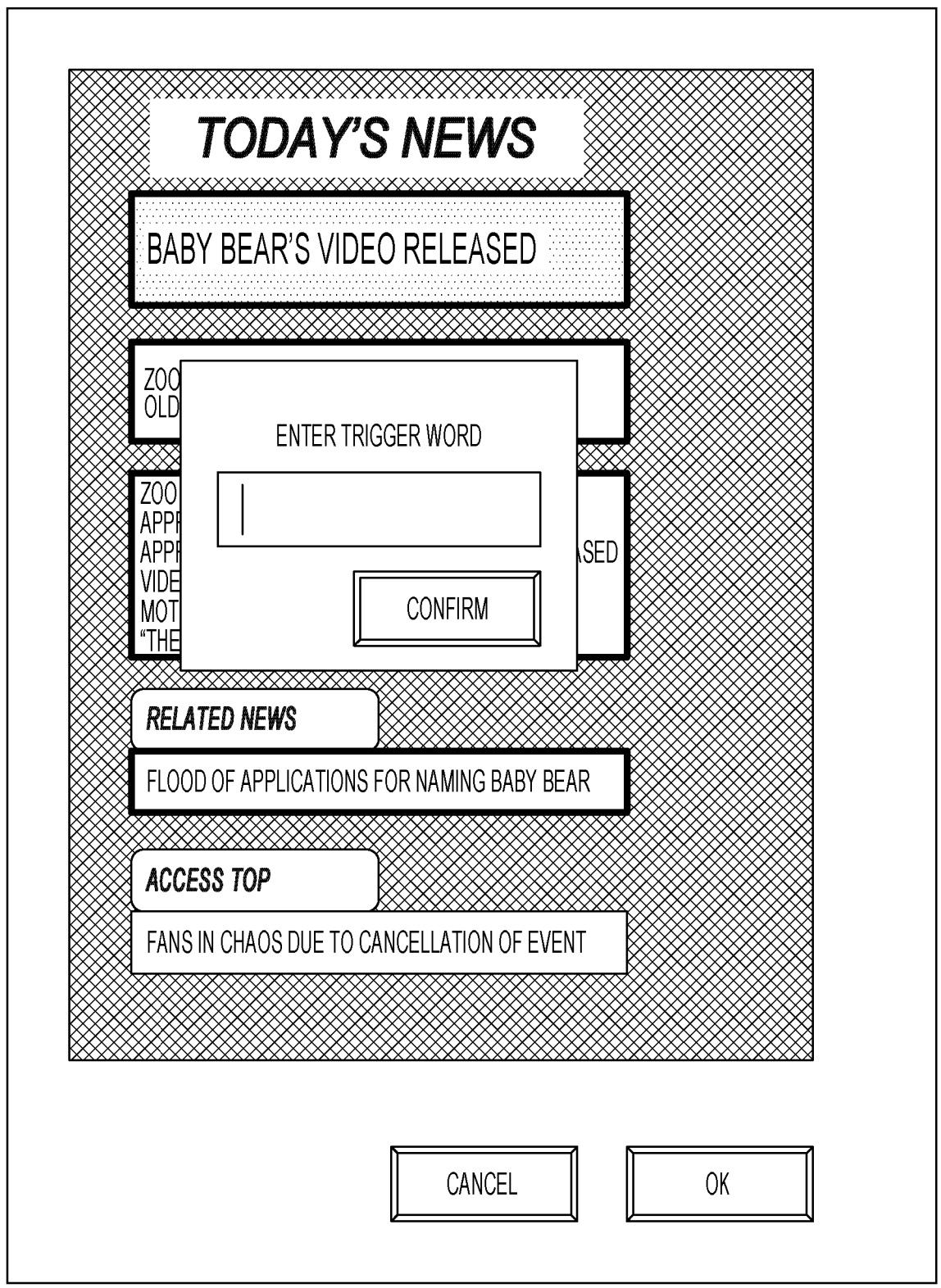
FIG. 15 is a diagram illustrating an example of an input window for a trigger word.

The first generation unit 603 displays an input window for the trigger word superimposed on the text display area specified by the record (S1407). FIG. 15 illustrates an example of the input window for the trigger word.

The first generation unit 603 accepts a trigger word input through a user operation and deletes the input window (S1409). The first generation unit 603 sets the accepted trigger word to the record (S1411). The first generation unit 603 superimposes a shaded pattern on the text display area for display (S1413).

Figure 16:
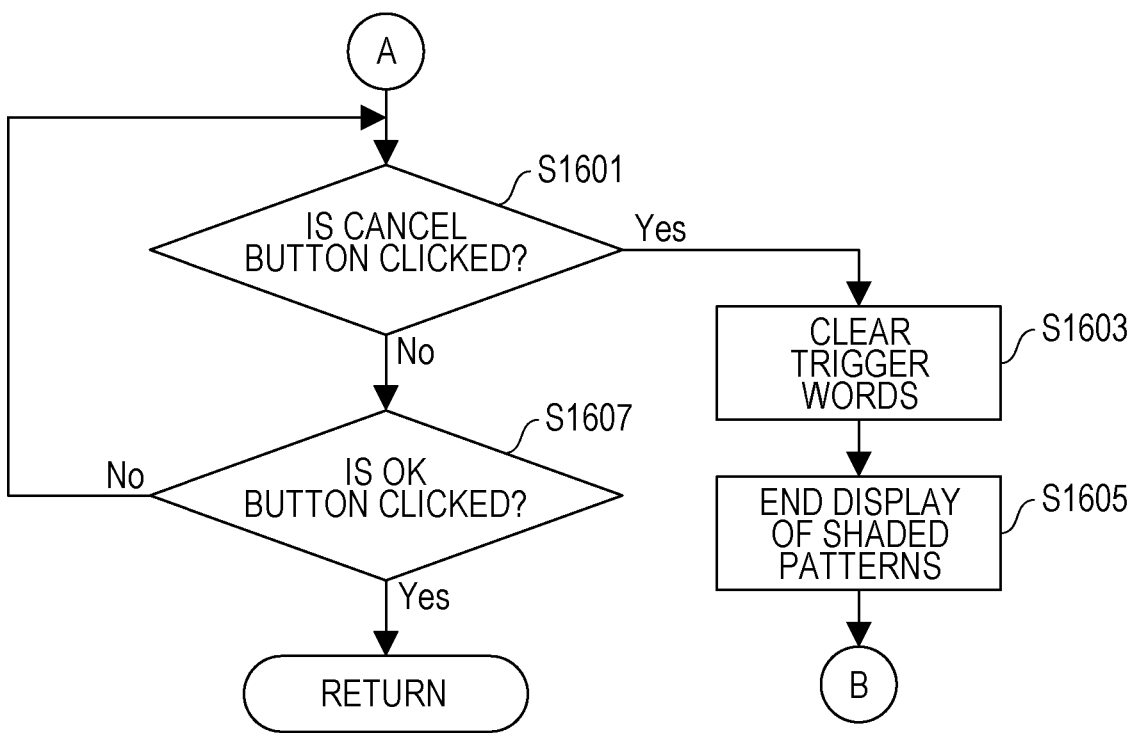
FIG. 16 is a diagram illustrating the trigger word setting process (A) flow.

The first generation unit 603 determines whether the property table has an unspecified record (S1415). If it is determined that the property table has an unspecified record, the process goes back to the process indicated in S1405 and repeats the above-described processes. On the other hand, if it is determined that the property table has no unspecified record, the process proceeds to a process of S1601 depicted in FIG. 16 via a terminal A.

The first generation unit 603 determines whether the cancel button is clicked (S1601). If determining that the cancel button is clicked, the first generation unit 603 clears the trigger words set to the property table (S1603) and ends the display of the shaded patterns (S1605). The process then goes back to the process of S1405 depicted in FIG. 14 via a terminal B.

On the other hand, if determining that the cancel button is not clicked, the first generation unit 603 determines whether the OK button is clicked (S1607). If it is determined that the OK button is not clicked, the process goes back to the process of S1601.

On the other hand, if it is determined that the OK button is clicked, the trigger word setting process ends and the process returns to the first preparation process that is a calling source.

As illustrated in FIG. 7, the process returns from the trigger word setting process, and then the first preparation process ends. At this stage, the property table relevant to the certain site is completed.

Figure 17:
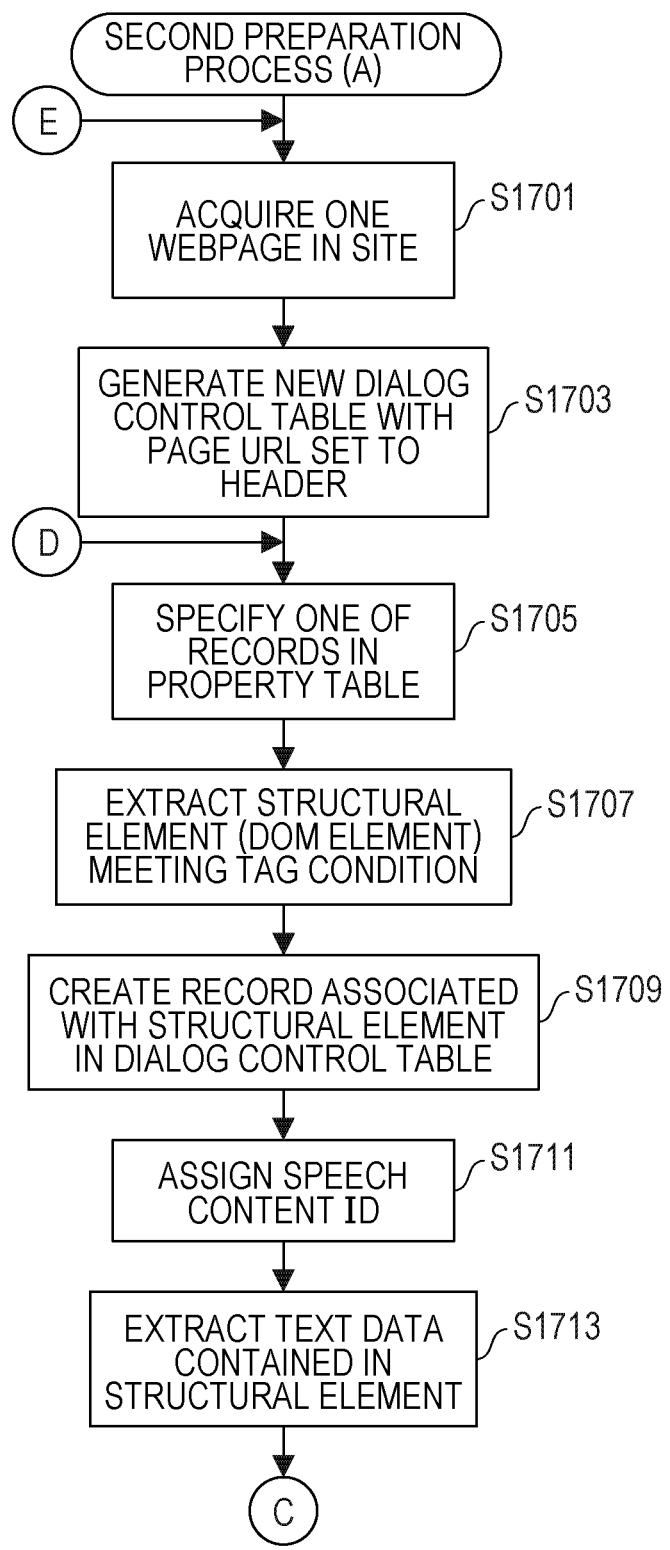
FIG. 17 is a diagram illustrating a second preparation process (A) flow.

A second preparation process will next be described. In the present embodiment, a second preparation process (A) is performed. FIG. 17 illustrates a second preparation process (A) flow. The acquisition unit 601 acquires one webpage in the site (S1701). The webpage to be acquired is freely selected. The acquisition unit 601 may acquire all webpages held in the site. Alternatively, the acquisition unit 601 may acquire some of the webpages.

The second generation unit 605 generates a new dialog control table with a page URL set to a header (S1703). At this stage, no record has yet been created to the dialog control table.

The second generation unit 605 specifies one of the records in the property table (S1705). For example, the second generation unit 605 specifies records one by one from the top.

The second generation unit 605 extracts a structural element meeting the tag condition set in the record concerned, from the webpage acquired in S1701 (S1707). At this time, the DOM parsing unit 621 may perform the DOM parsing process relevant to the webpage and, based on the result of the DOM parsing process, the second generation unit 605 may specify a DOM element meeting the tag condition.

The second generation unit 605 creates a record associated with the structural element in the dialog control table (S1709). The second generation unit 605 assigns a speech content ID and sets the speech content ID to the record (S1711).

The second generation unit 605 then extracts text data contained in the structural element (S1713). This extracted text data corresponds to the text displayed based on the description of the text display contained in the structural element concerned. The process proceeds to the process of S1801 depicted in FIG. 18 via a terminal C.

The second generation unit 605 sets the extracted text data to the record of the dialog control table created in S1709 of FIG. 17 (S1801). The second generation unit 605 further sets the area name set to the record of the property table specified in S1705 to the record concerned of the dialog control table (S1803).

Then, the second generation unit 605 determines whether the structural element contains a URL of a link destination (S1805). For example, in the case of a structural element of "area name: related news", the URL linking to the webpage of the news concerned is described.

If determining that the structural element contains the URL of the link destination, the second generation unit 605 sets the URL to the field of link destination in the record of the dialog control table created in S1709 of FIG. 17 (S1807). In S1805, if it is determined that the structural element does not contain the URL of the link destination, the process proceeds directly to the process of S1809.

The second generation unit 605 determines whether the property table has an unspecified record (S1809). If it is determined that the property table has an unspecified record, the process goes back to the process of S1705 depicted in FIG. 17 via a terminal D.

On the other hand, if determining that the property table has no unspecified record, the second generation unit 605 performs a selection condition setting process (S1811). The second generation unit 605 performs the selection condition setting process and sets a selection condition.

Figure 19:
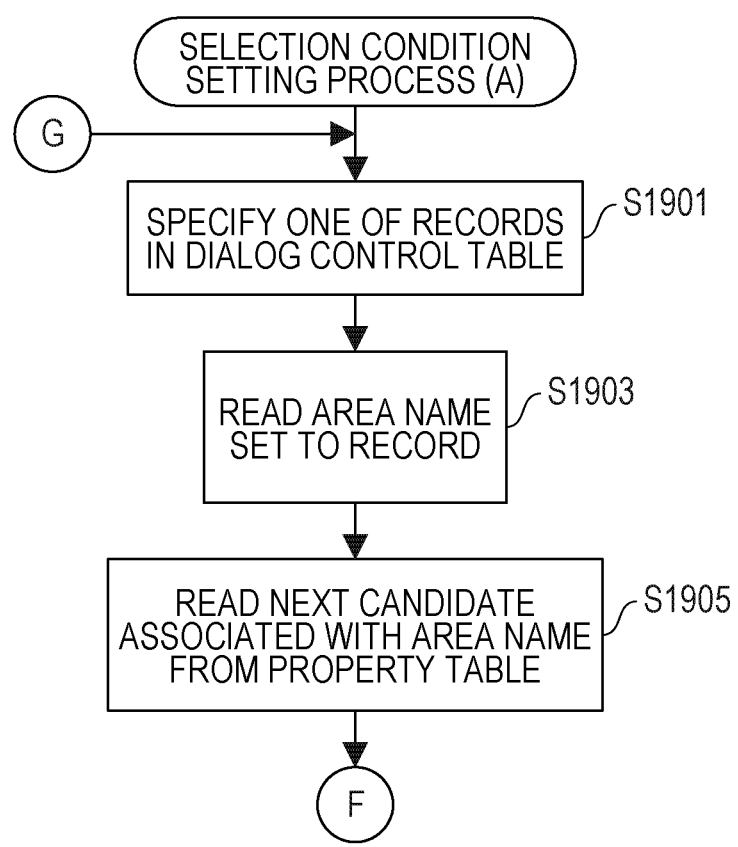
FIG. 19 is a diagram illustrating a selection condition setting process (A) flow.

In the present embodiment, a selection condition setting process (A) is performed. FIG. 19 illustrates a selection condition setting process (A) flow. The second generation unit 605 specifies one of the records in the dialog control table (S1901). For example, the second generation unit 605 specifies records one by one from the top. In this case, the record of the speech content ID: T1 is specified first.

The second generation unit 605 reads the area name set to the record (S1903). In the case of the record of the speech content ID: T1, for example, "area name: title" is read.

Figure 20:
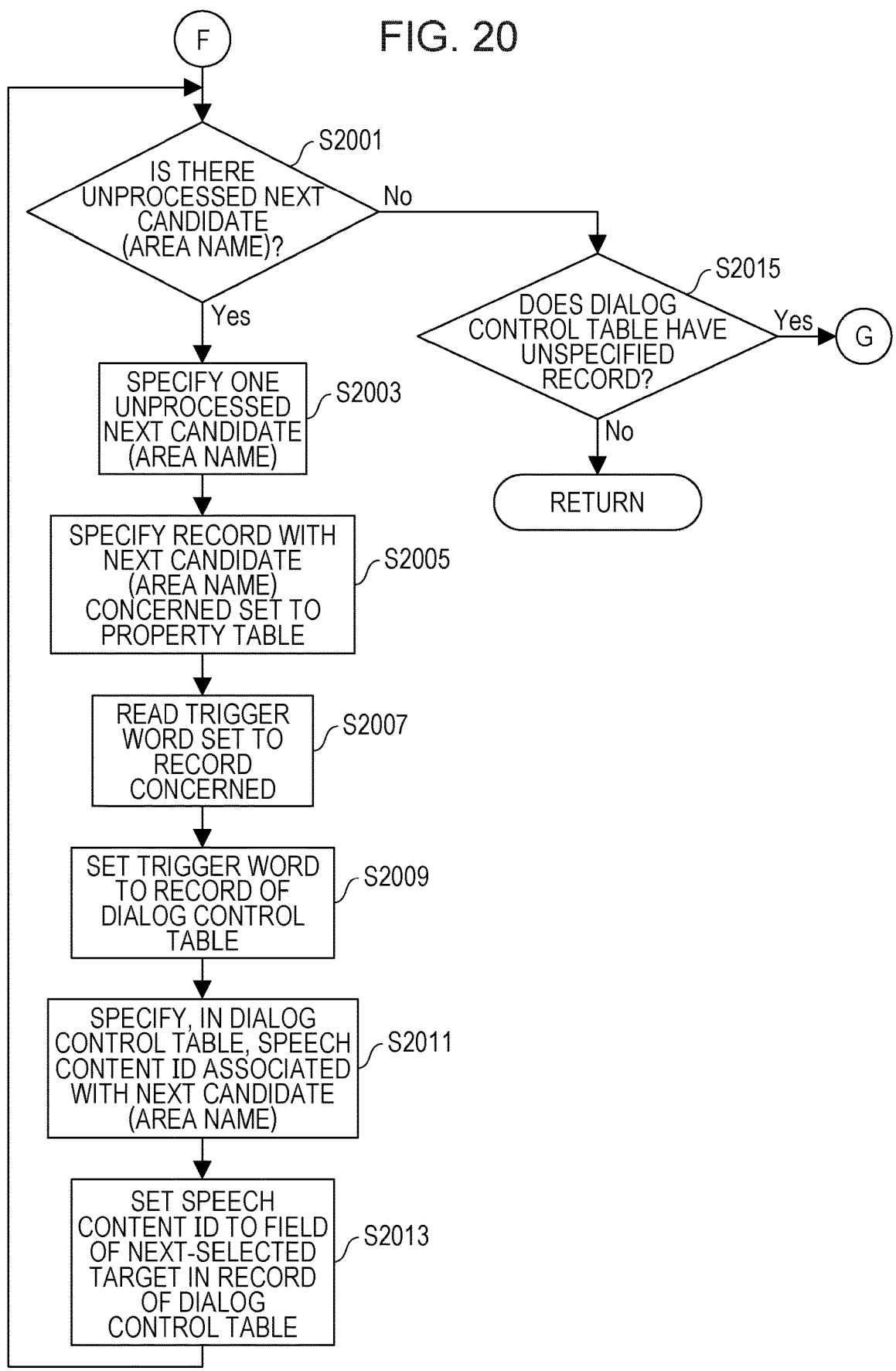
FIG. 20 is a diagram illustrating the selection condition setting process (A) flow.

The second generation unit 605 reads a next candidate associated with the area name from the property table (S1905). Specifically, the second generation unit 605 specifies a record with the area name concerned set and reads an area name set to the field of next candidate in the record. In the case of "area name: title", for example, the area name of "outline" and "body" is read. The process then proceeds to a process of S2001 depicted in FIG. 20 via a terminal F.

The second generation unit 605 determines whether there is an unprocessed area name of the area names read as the next candidate in S1905 (S2001). If determining that there is an unprocessed next candidate (area name), the second generation unit 605 specifies one unprocessed next candidate (area name) (S2003). The second generation unit 605 then specifies a record with the next candidate (area name) concerned set to the property table (S2005). For example, when "area name: outline" is specified as the next candidate, the second record of the property table illustrated in FIG. 3 is specified.

The second generation unit 605 reads a trigger word set to the record concerned (S2007) and sets the trigger word to the record of the dialog control table specified in S1901 (S2009). For example, the trigger words set to the second record of the property table illustrated in FIG. 3, "summary" and "roughly", are set to the first record of the dialog control table illustrated in FIG. 1.

The second generation unit 605 specifies, in the dialog control table, a speech content ID associated with the next candidate (area name) specified in S2003 (S2011). For example, when the next candidate (area name) is "outline", the speech content ID: T2 is specified. The speech content ID: T2 is the second record with "outline" set to the field of area name in the dialog control table illustrated in FIG. 1.

Then, in the record of the dialog control table specified in S1901, the second generation unit 605 sets the speech content ID to the field of next-selected target associated with the trigger word set in S2009 (S2013). The process then goes back to the process indicated in S2001 and repeats the above-described processes. For example, the speech content ID: T2 is set as the next-selected target associated with the trigger words, "summary" and "roughly".

In S2001, if determining that there is no unprocessed next candidate (area name), the second generation unit 605 determines whether the dialog control table has an unspecified record (S2015). If it is determined that the dialog control table has an unspecified record, the process goes back to the process of S1901 depicted in FIG. 19 via a terminal G.

On the other hand, if it is determined that the dialog control table has no unspecified record, the selection condition setting process ends and the process returns to the second preparation process that is a calling source.

Figure 18:
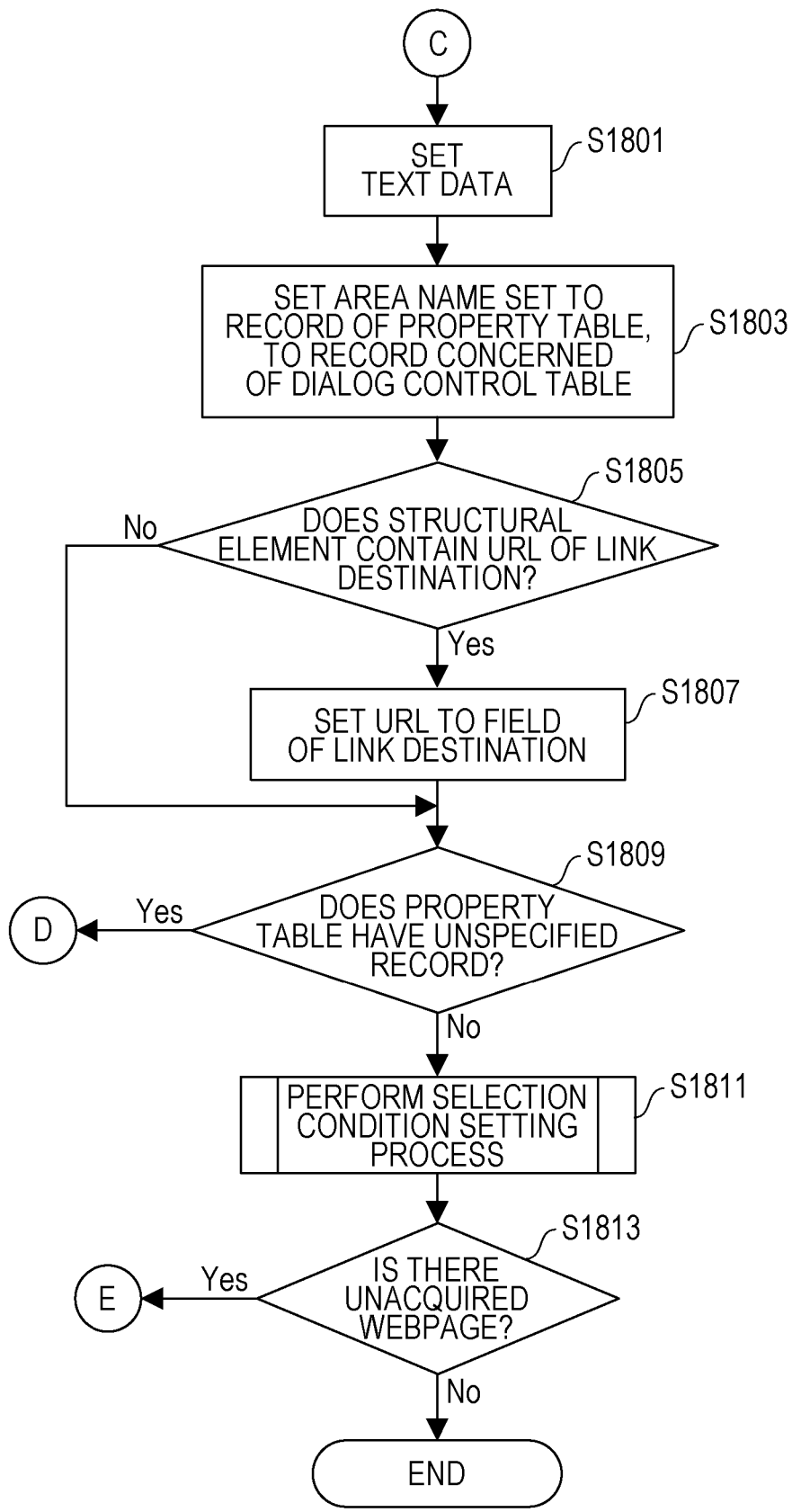
FIG. 18 is a diagram illustrating the second preparation process (A) flow.

The description goes back to FIG. 18. Upon returning from the selection condition setting process, the second generation unit 605 determines whether there is an unacquired webpage (S1813). If it is determined that there is an unacquired webpage, the process goes back to the process of S1701 depicted in FIG. 17 via a terminal E.

On the other hand, if it is determined that there is no unacquired webpage, the second preparation process ends. At this stage, the generation of the dialog control table based on the webpage of the certain site is completed.

Processes of the dialog server 501 in the dialog phase (S405) will next be described.

Figure 21:
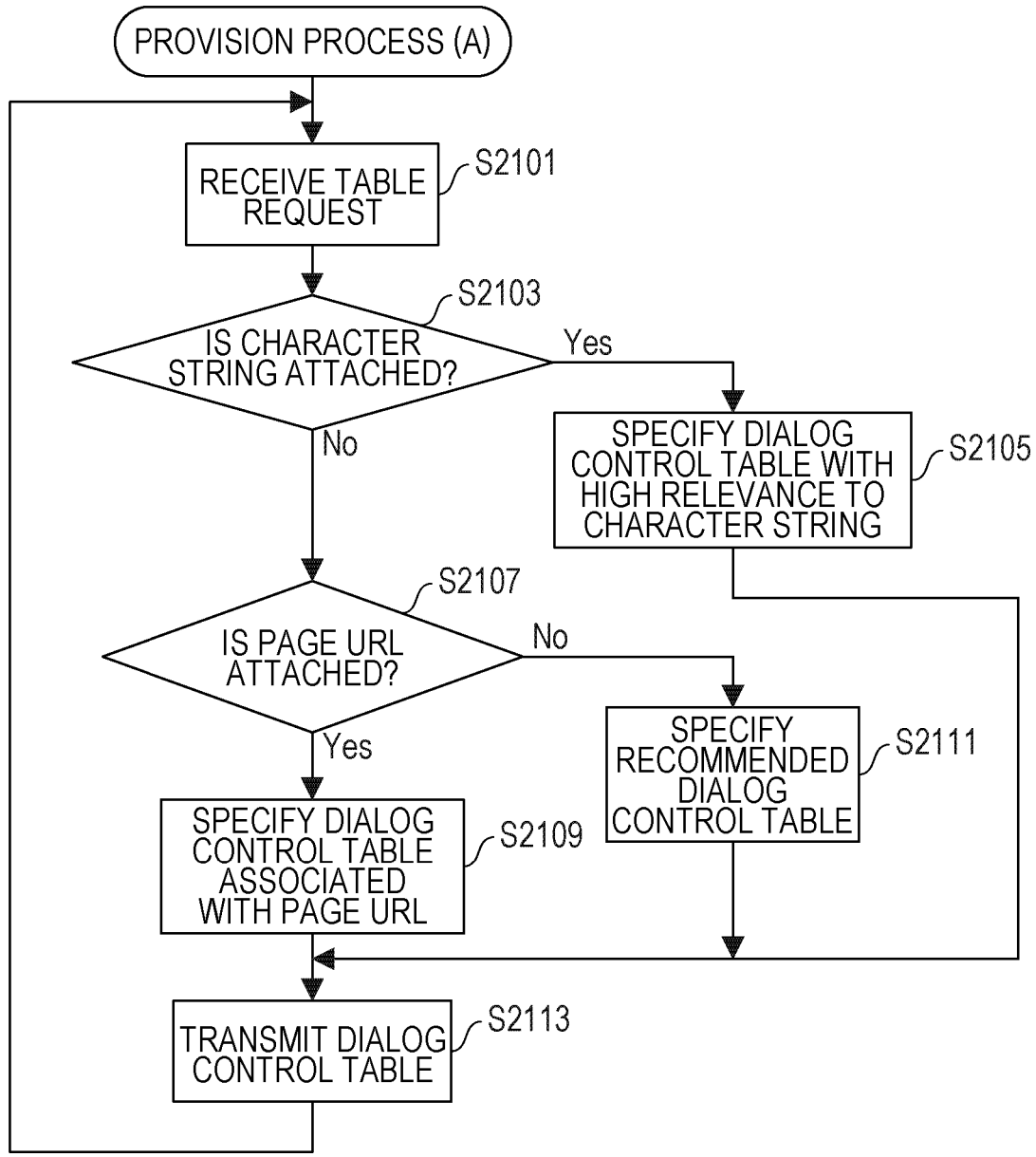
FIG. 21 is a diagram illustrating a provision process (A) flow.

In the dialog phase (S405), the provision unit 607 performs a provision process. In the present embodiment, a provision process (A) is performed. FIG. 21 illustrates a provision process (A) flow. The reception unit 611 receives a request for a dialog control table from the user terminal 505 (S2101). The above-described request for the dialog control table refers to a table request. The table request is assumed to be a table request with a character string attached thereto, a table request with a page URL attached thereto, or a table request with neither of them attached thereto.

The specification unit 613 determines whether a character string is attached to the received table request (S2103). If determining that a character string is attached to the table request, the specification unit 613 specifies a dialog control table with high relevance to the character string (S2105). The specification unit 613, for example, specifies a feature word contained in the character string by referring to the word database 649 and selects a dialog control table including text data that contains a word with high relevance to the feature word.

On the other hand, if determining that no character string is attached to the table request, the specification unit 613 determines whether a page URL is attached to the table request (S2107). If determining that a page URL is attached to the table request, the specification unit 613 specifies a dialog control table associated with the page URL (S2109).

On the other hand, if determining that a page URL is not attached to the table request, the specification unit 613 specifies a recommended dialog control table (S2111). A method for specifying the recommended dialog control table is freely selected. For example, the latest dialog control table may be recommended.

The transmission unit 615 transmits the specified dialog control table to the user terminal 505 that is a request source (S2113). The process then goes back to the process indicated in S2101 and repeats the above-described processes.

Figure 22:
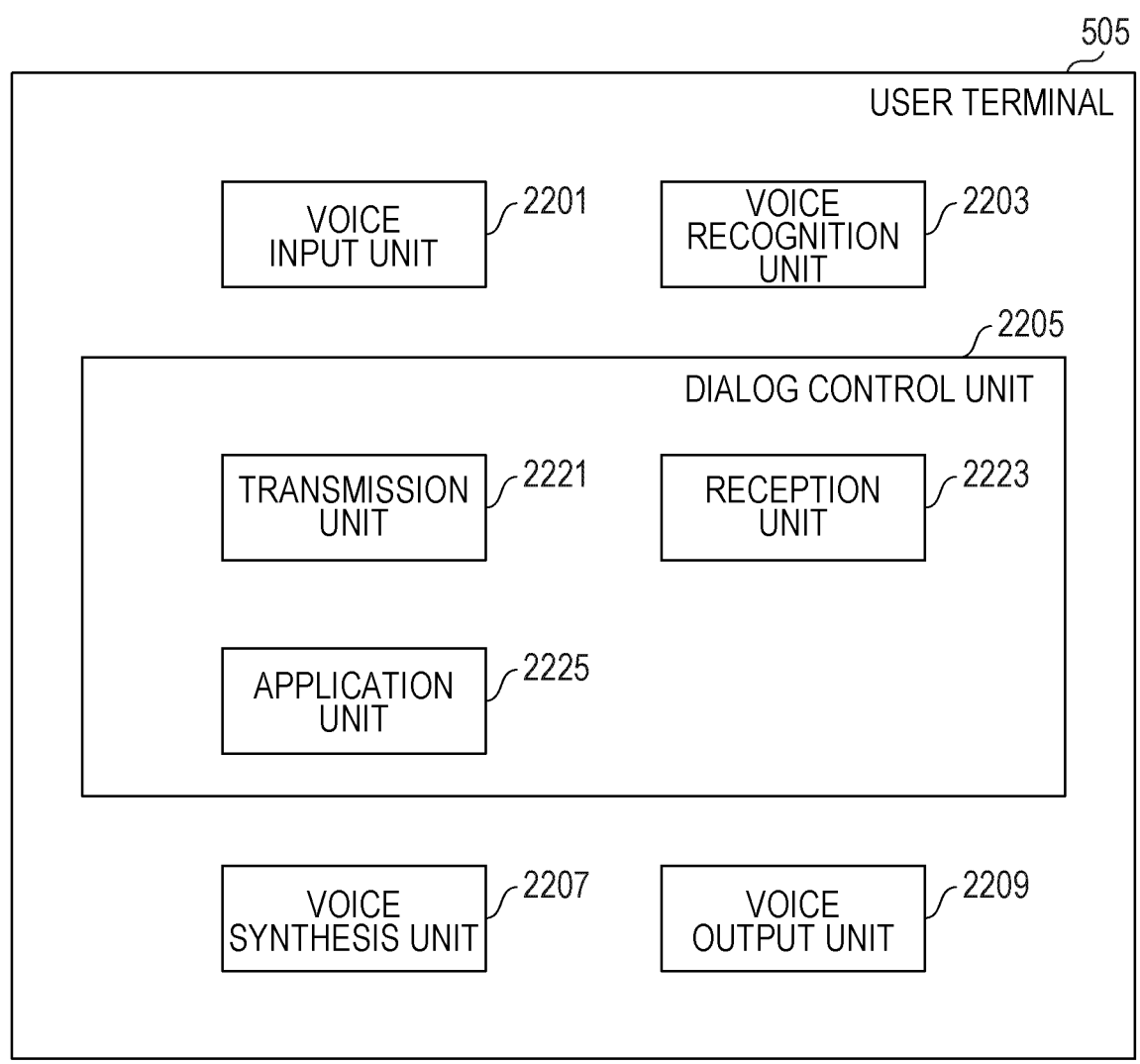
FIG. 22 is a diagram illustrating a module configuration example of a user terminal.

Operations of the user terminal 505 in the dialog phase will next be described. FIG. 22 illustrates a module configuration example of the user terminal 505. The user terminal 505 includes a voice input unit 2201, a voice recognition unit 2203, a dialog control unit 2205, a voice synthesis unit 2207, and a voice output unit 2209.

The voice input unit 2201 inputs a user voice. The voice recognition unit 2203 recognizes the user voice and outputs text. The dialog control unit 2205 controls an automatic dialog with the user. The dialog control unit 2205 has a transmission unit 2221, a reception unit 2223, and an application unit 2225. The transmission unit 2221 transmits the table request. The reception unit 2223 receives the dialog control table. The application unit 2225 performs an automatic dialog based on the received dialog control table. The voice synthesis unit 2207 makes a synthesis to obtain an artificial voice for the text. The voice output unit 2209 outputs the synthesized artificial voice.

The voice input unit 2201, the voice recognition unit 2203, the dialog control unit 2205, the voice synthesis unit 2207, the voice output unit 2209, the transmission unit 2221, the reception unit 2223, and the application unit 2225, which are described above, are implemented by using a hardware resource (FIG. 40, for example) and a program causing, for example, a CPU to execute the below-described processes.

Figure 23:
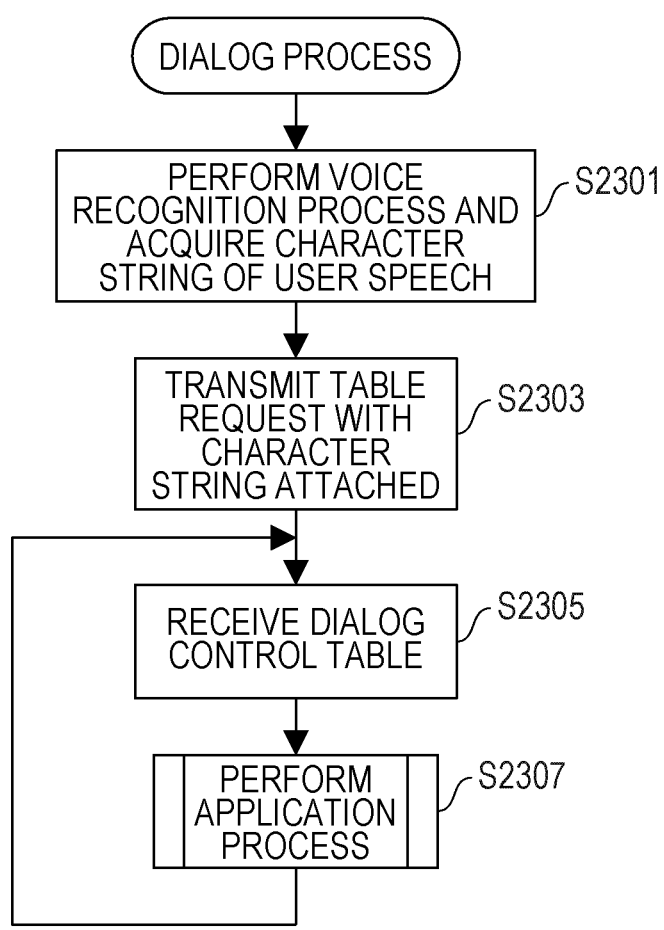
FIG. 23 is a diagram illustrating a dialog process flow.

A dialog process performed by the dialog control unit 2205 will be described. FIG. 23 illustrates a dialog process flow. The voice recognition unit 2203 performs a voice recognition process for a voice input by the voice input unit 2201, and the dialog control unit 2205 acquires a character string of a user speech from the voice recognition unit 2203 (S2301).

The transmission unit 2221 transmits a table request with the character string of the user speech attached thereto to the dialog server 501 (S2303).

The reception unit 2223 receives the dialog control table from the acquisition unit 601 (S2305), and then the application unit 2225 performs an application process (S2307). In the application process, the application unit 2225 performs an automatic dialog with the dialog control table applied and also performs a process for requesting the next dialog control table to the acquisition unit 601.

Figure 24:
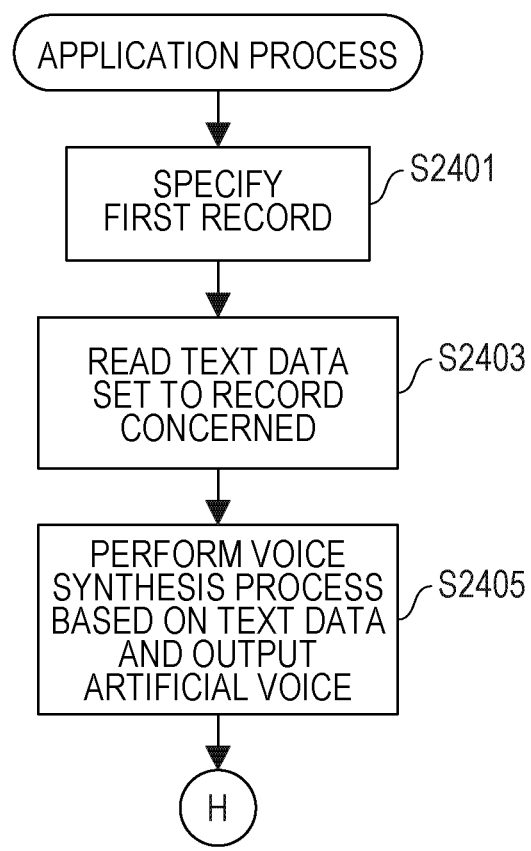
FIG. 24 is a diagram illustrating an application process flow.

FIG. 24 illustrates an application process flow. The application unit 2225 specifies the first record of the dialog control table (S2401). In this example, a machine speech starts with the first speech content, but a machine speech may start with a speech content other than the first speech content. That is, a record specified first may be determined by other methods.

Figure 25:
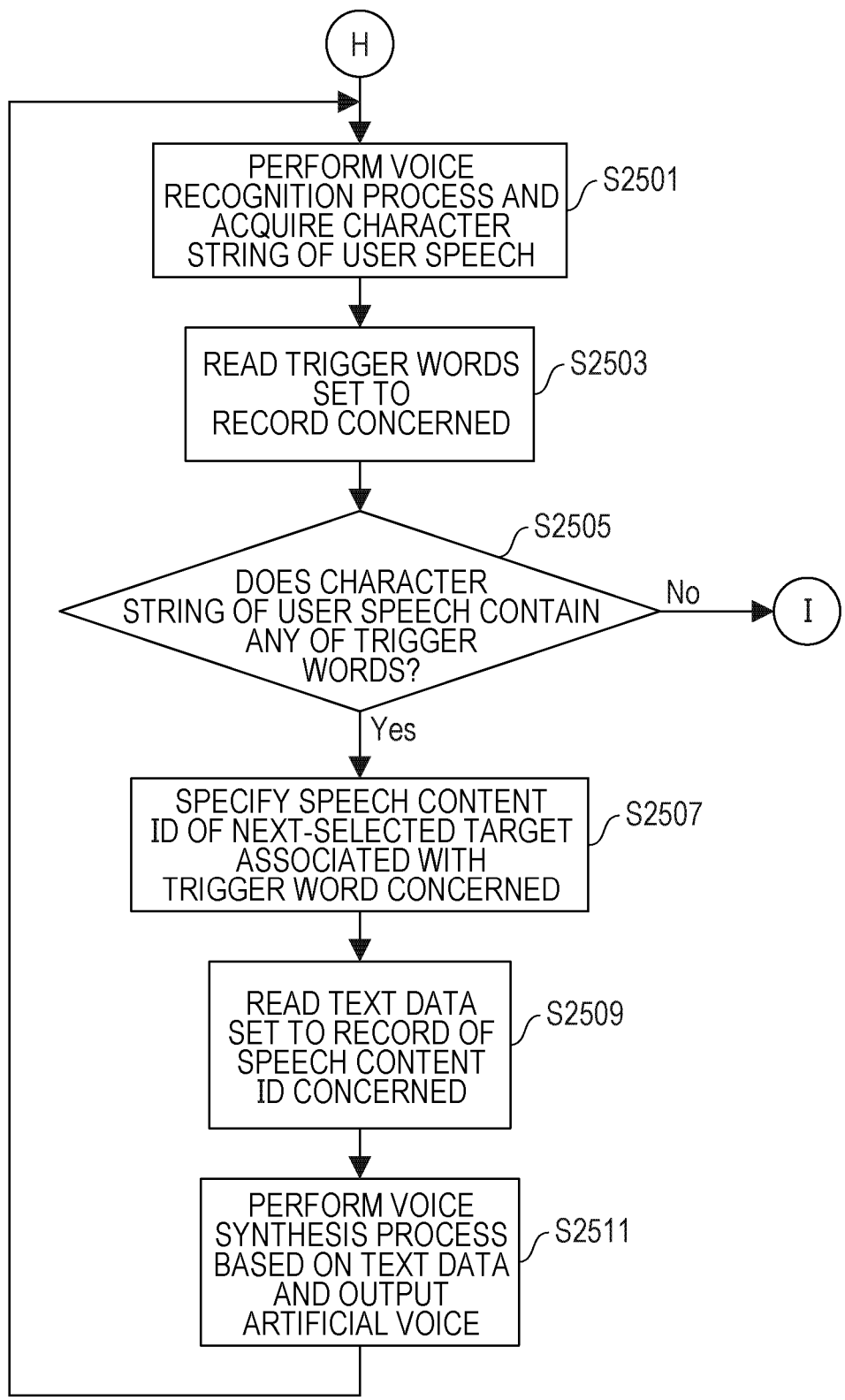
FIG. 25 is a diagram illustrating the application process flow.

The application unit 2225 reads text data set to the record concerned (S2403). The voice synthesis unit 2207 performs a voice synthesis process based on the text data and the voice output unit 2209 outputs the synthesized artificial voice (S2405). The process then proceeds to a process of S2501 depicted in FIG. 25 via a terminal H.

The voice recognition unit 2203 performs the voice recognition process for the voice input by the voice input unit 2201, and the application unit 2225 acquires the character string of the user speech from the voice recognition unit 2203 (S2501).

The application unit 2225 reads the trigger words set to the record to be processed in the dialog control table (S2503). The application unit 2225 then determines whether the character string of the user speech contains any of the trigger words (S2505).

If determining that the character string of the user speech contains any of the trigger words, the application unit 2225 specifies the speech content ID of the next-selected target associated with the trigger word concerned (S2507). The application unit 2225 then reads the text data set to the record of the speech content ID concerned (S2509). Then, the voice synthesis unit 2207 performs the voice synthesis process based on the text data and the voice output unit 2209 outputs an artificial voice (S2511).

The process then goes back to the process indicated in S2501 and repeats the above-described processes. In the subsequent process of S2503, the record of the speech content ID specified in S2507 is targeted for the process.

Figure 26:
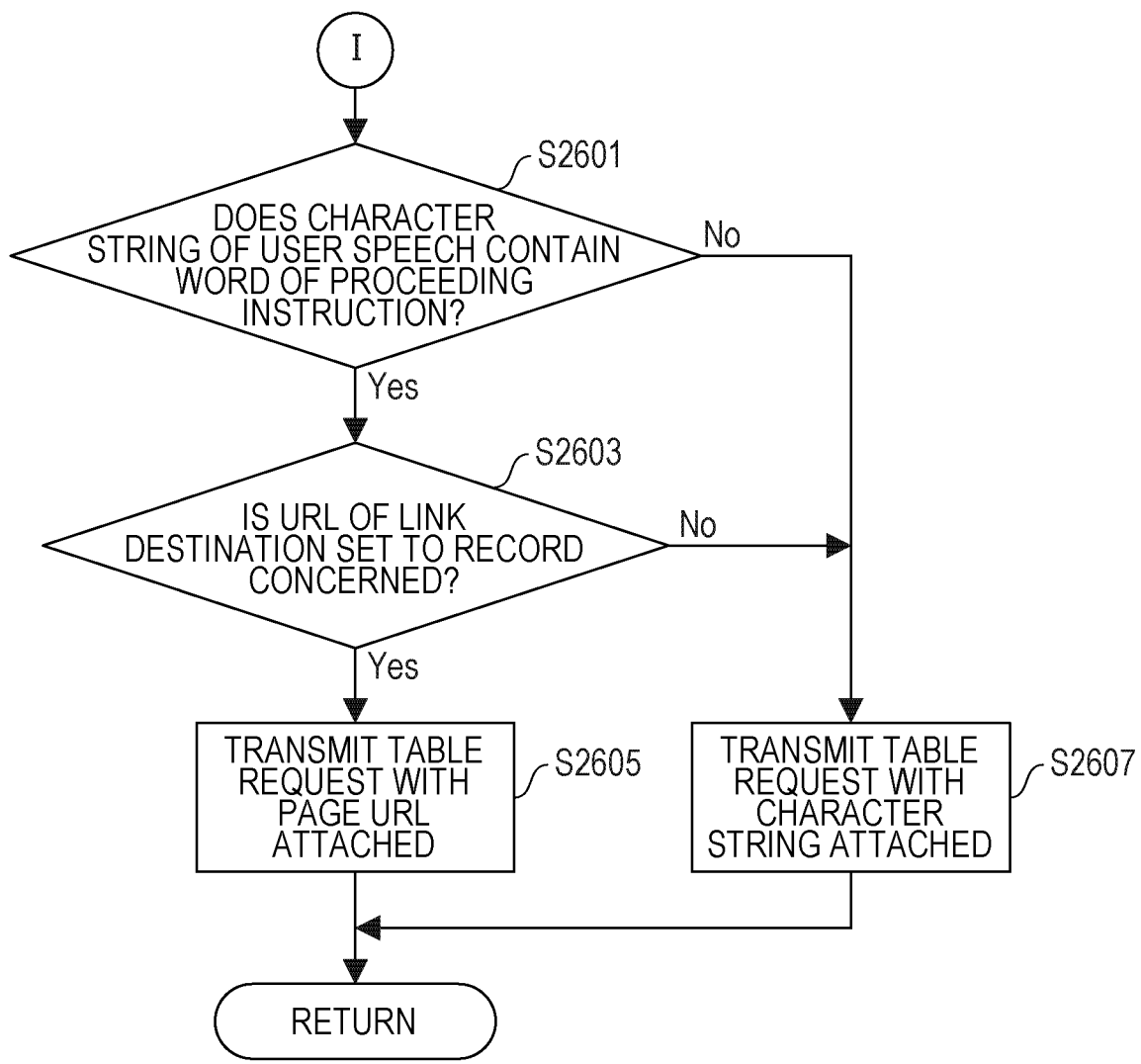
FIG. 26 is a diagram illustrating the application process flow.

If it is determined that the character string of the user speech does not contain any of the trigger words in S2505, the process proceeds to a process of S2601 depicted in FIG. 26 via a terminal I.

The application unit 2225 determines whether the character string of the user speech contains a word of a proceeding instruction (S2601). Examples of the word of the proceeding instruction include "continue" and "go ahead".

If determining that the character string of the user speech contains a word of a proceeding instruction, the application unit 2225 determines whether a URL of a link destination is set to the record to be processed in the dialog control table (S2603). If determining that a URL of a link destination is set to the record to be processed, the application unit 2225 transmits a table request with the URL of the link destination (corresponding to the page URL) attached thereto to the dialog server 501 (S2605). The application process then ends and the process returns to the dialog process that is a calling source.

On the other hand, if it is determined that, in S2601, the character string of the user speech does not contain a word of a proceeding instruction and that, in S2603, a URL of a link destination is not set to the record to be processed, the application unit 2225 transmits a table request with the character string of the user speech attached thereto to the dialog server 501 (S2607). The application process then ends and the process returns to the dialog process that is a calling source.

The description goes back to FIG. 23. The application process ends, and the process goes back to the process indicated in S2305 and then repeats the above-described processes.

According to the present embodiment, easy preparation is achieved for an automatic dialog using comparable webpages as an information source.

Moreover, setting of the trigger words to the dialog control table based on the property table contributes to a machine speech suitable for the interest of a listener.

Embodiment 2

In this embodiment, an example will be described in which the next candidate and the trigger word are automatically set in association with the area name by referring to the preset table that is prepared in advance.

FIG. 27 illustrates an example of the preset table. The preset table includes records associated with expected area names. Each record of the preset table includes a field with an area name set, a field with a trigger word set, and a field of next candidate. In each record of the preset table, the area name is associated with the trigger word and also with the area name of the next candidate. These associations may be performed based on an expectation.

Figure 28:
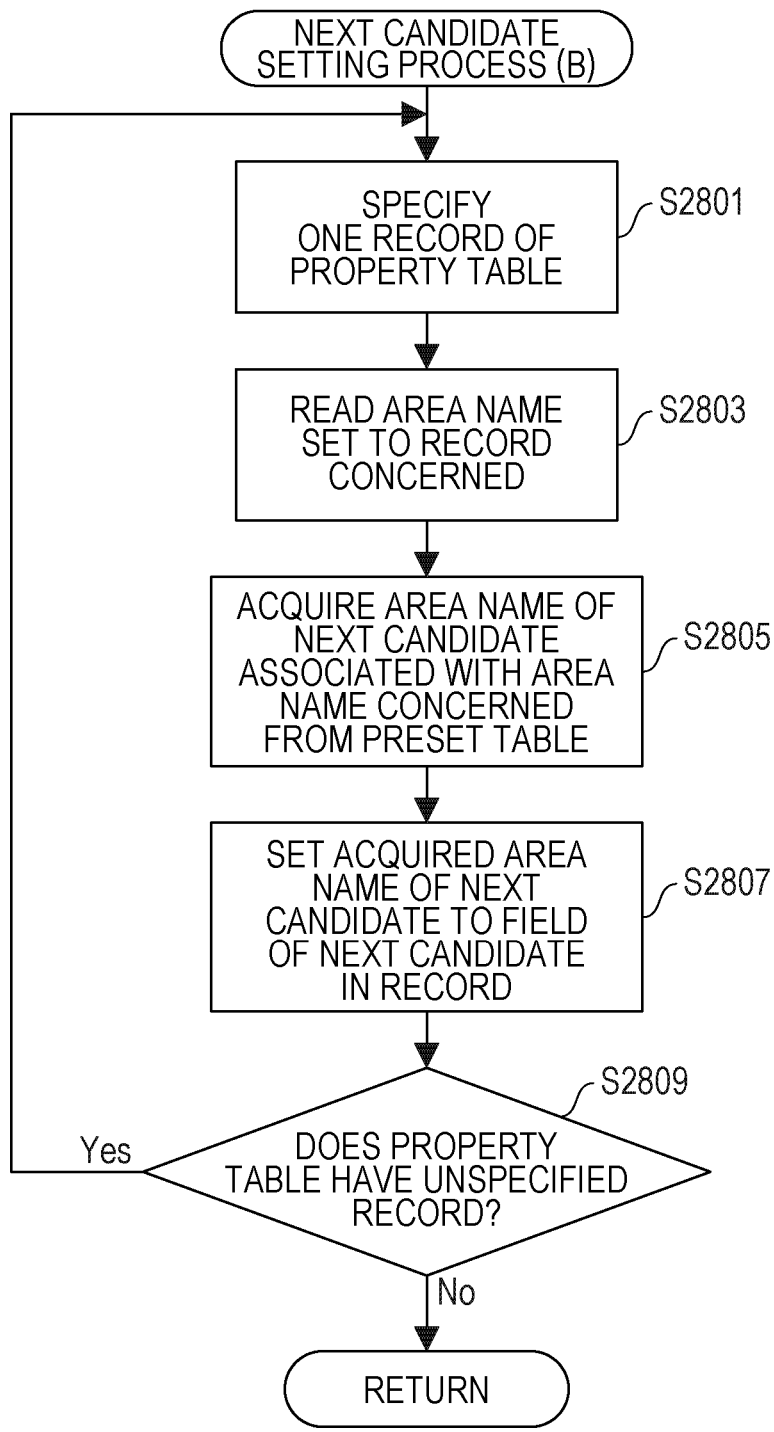
FIG. 28 is a diagram illustrating a next candidate setting process (B) flow.

In the present embodiment, a next candidate setting process (B) is performed instead of the next candidate setting process (A). FIG. 28 illustrates a next candidate setting process (B) flow. The first generation unit 603 specifies one record of the property table (S2801).

The first generation unit 603 reads an area name set to the record concerned (S2803) and acquires an area name of the next candidate associated with the area name concerned from the preset table (S2805). The first generation unit 603 then sets the acquired area name of the next candidate to the field of next candidate in the record (S2807).

The first generation unit 603 determines whether the property table has an unspecified record (S2809). If it is determined that the property table has an unspecified record, the process goes back to the process indicated in S2801 and repeats the above-described processes.

On the other hand, if it is determined that the property table has no unspecified record, the next candidate setting process (B) ends and the process returns to the first preparation process that is a calling source.

Figure 29:
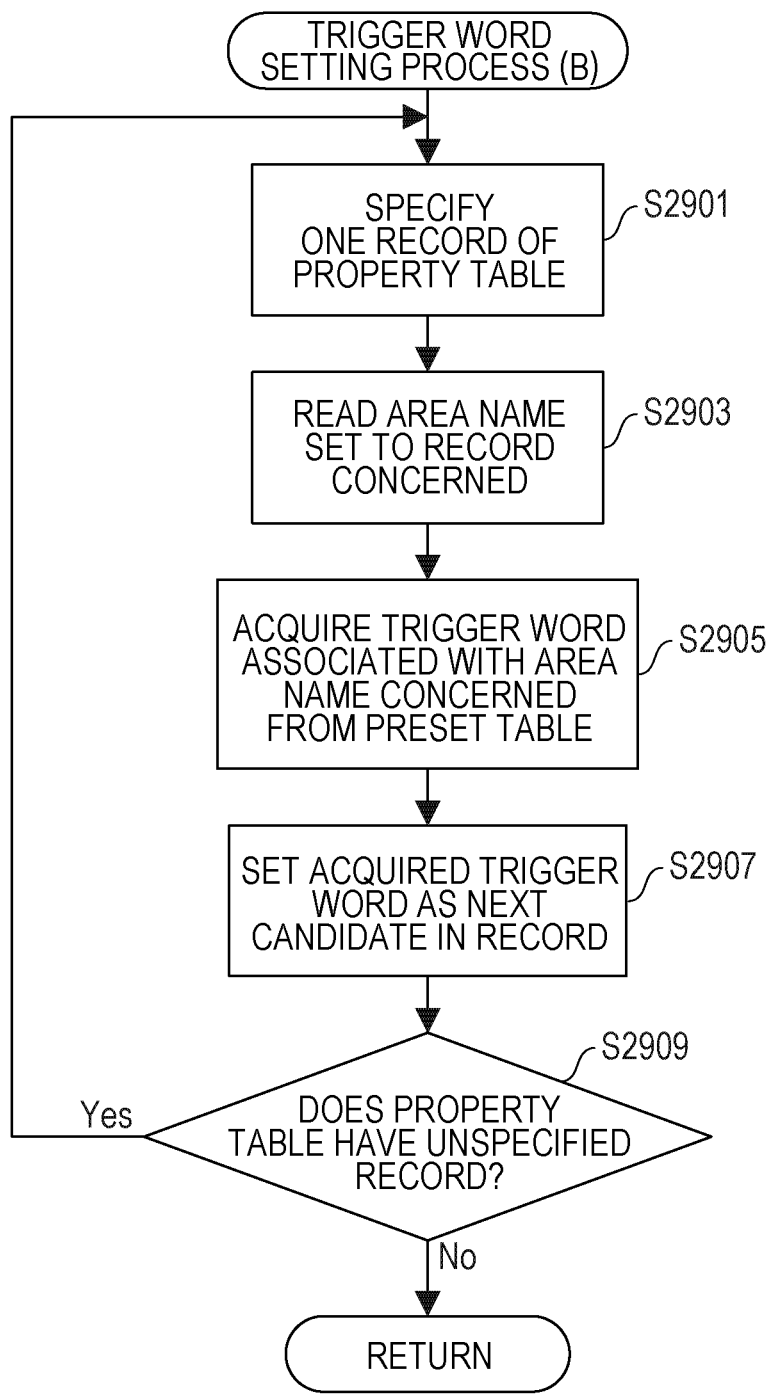
FIG. 29 is a diagram illustrating a trigger word setting process (B) flow.

Additionally in the present embodiment, a trigger word setting process (B) is performed instead of the trigger word setting process (A). FIG. 29 illustrates a trigger word setting process (B) flow. The first generation unit 603 specifies one record of the property table (S2901).

The first generation unit 603 reads an area name set to the record concerned (S2903) and acquires a trigger word associated with the area name concerned from the preset table (S2905). The first generation unit 603 then sets the acquired trigger word as the next candidate in the record (S2907).

The first generation unit 603 determines whether the property table has an unspecified record (S2909). If it is determined that the property table has an unspecified record, the process goes back to the process indicated in S2901 and repeats the above-described processes.

On the other hand, if it is determined that the property table has no unspecified record, the trigger word setting process (B) ends and the process returns to the first preparation process that is a calling source.

According to the present embodiment, the next candidate is automatically set in association with the area name, which saves time and effort to set the next candidate through a user operation.

The trigger word is also automatically set in association with the area name, which also saves time and effort to set the trigger word through a user operation.

Embodiment 3

In this embodiment, an example will be described in which the next candidate and the trigger word are automatically set in association with the area name by referring to the property table relevant to a different site.

Figure 30:
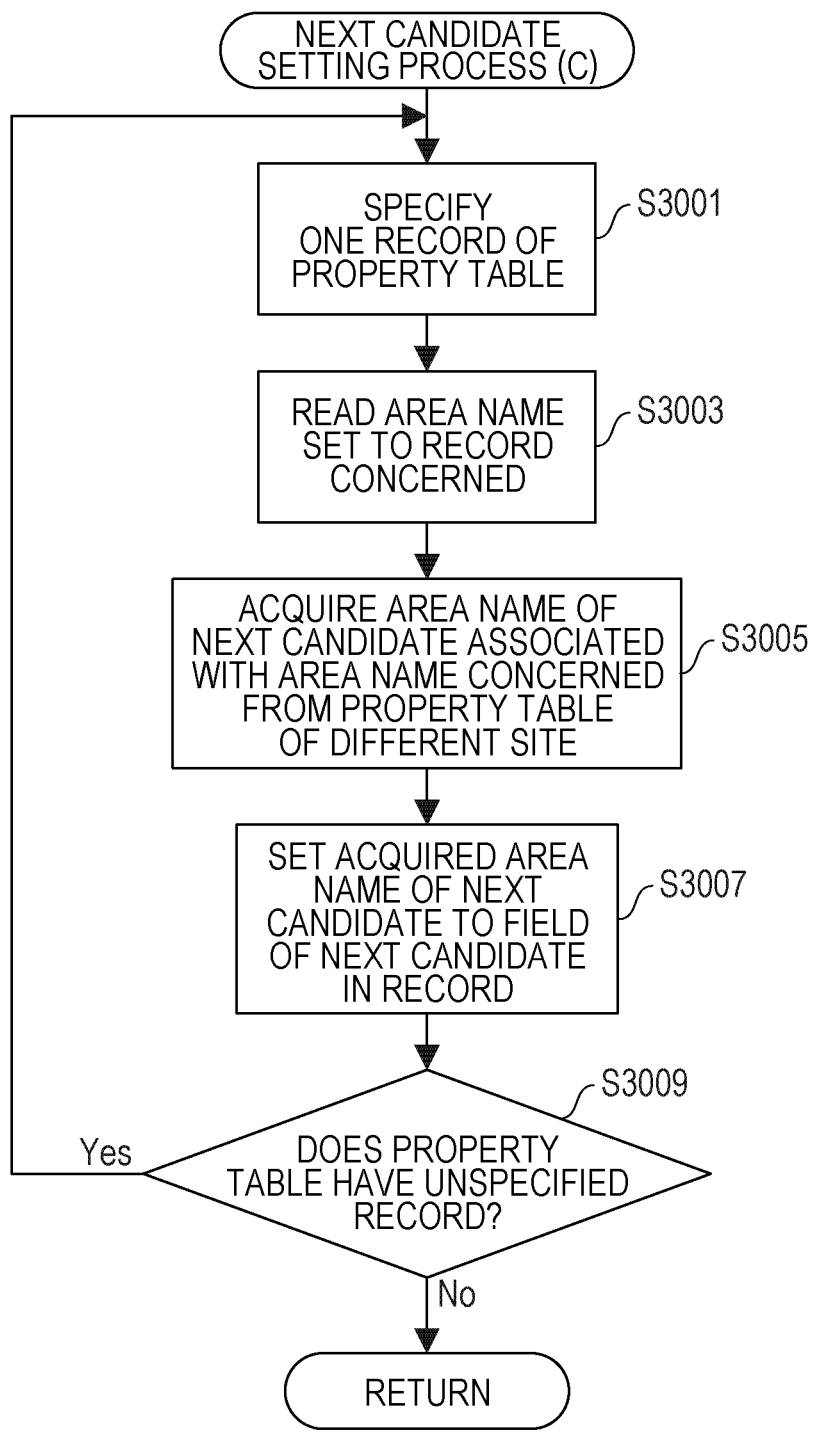
FIG. 30 is a diagram illustrating a next candidate setting process (C) flow.

In the present embodiment, a next candidate setting process (C) is performed instead of the next candidate setting process (A). FIG. 30 illustrates a next candidate setting process (C) flow. The first generation unit 603 specifies one record of the property table (S3001).

The first generation unit 603 reads an area name set to the record concerned (S3003) and acquires an area name of the next candidate associated with the area name concerned from a property table of the different site (S3005). The first generation unit 603 then sets the acquired area name of the next candidate to the field of next candidate in the record (S3007).

The first generation unit 603 determines whether the property table has an unspecified record (S3009). If it is determined that the property table has an unspecified record, the process goes back to the process indicated in S3001 and repeats the above-described processes.

On the other hand, if it is determined that the property table has no unspecified record, the next candidate setting process (C) ends and the process returns to the first preparation process that is a calling source.

Figure 31:
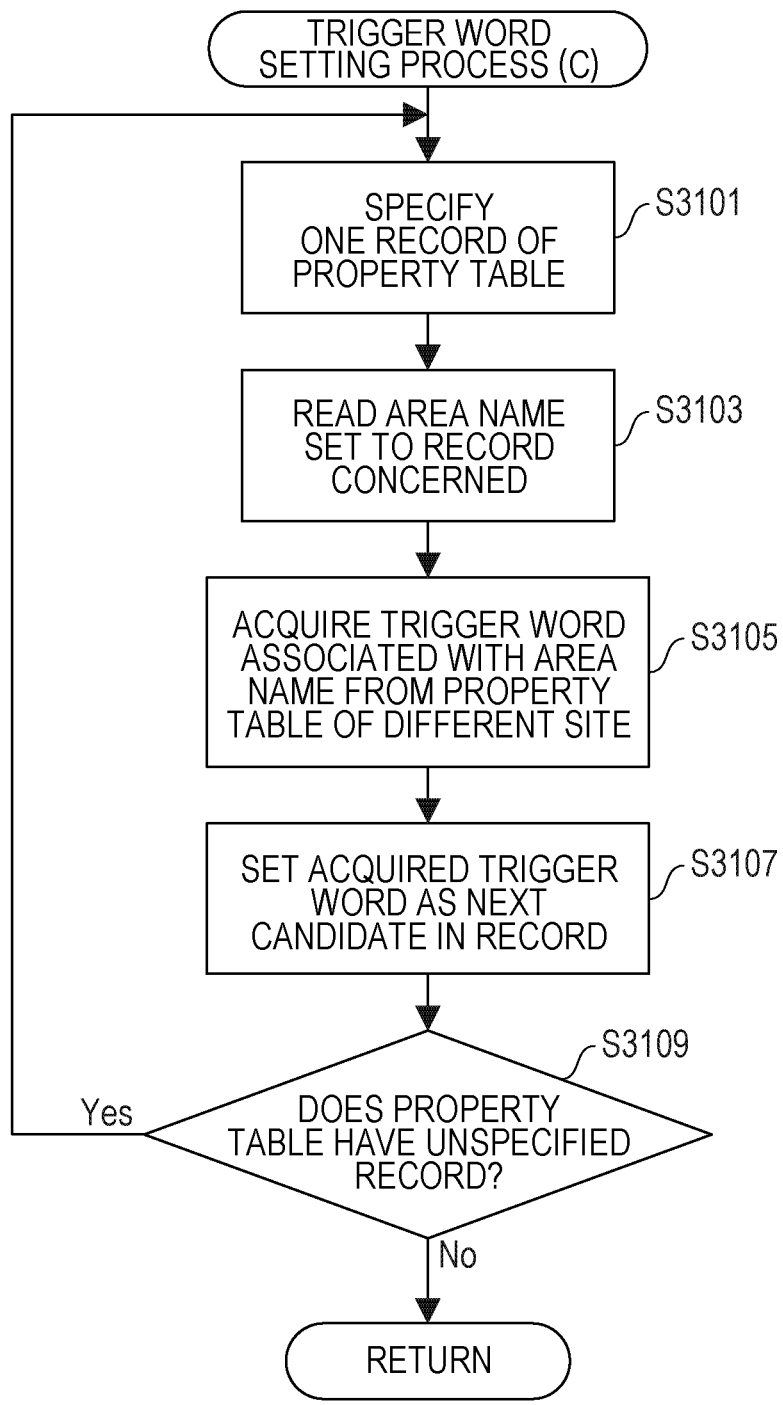
FIG. 31 is a diagram illustrating a trigger word setting process (C) flow.

Additionally in this embodiment, a trigger word setting process (C) is performed instead of the trigger word setting process (A). FIG. 31 illustrates a trigger word setting process (C) flow. The first generation unit 603 specifies one record of the property table (S3101).

The first generation unit 603 reads an area name set to the record concerned (S3103) and acquires a trigger word associated with the area name from the property table of the different site (S3105). The first generation unit 603 then sets the acquired trigger word as the next candidate in the record (S3107).

The first generation unit 603 determines whether the property table has an unspecified record (S3109). If it is determined that the property table has an unspecified record, the process goes back to the process indicated in S3101 and repeats the above-described processes.

On the other hand, if it is determined that the property table has no unspecified record, the trigger word setting process (C) ends and the process returns to the first preparation process that is a calling source.

According to the present embodiment, the next candidate is automatically set in association with the area name, which saves time and effort to set the next candidate through a user operation.

The trigger word is also automatically set in association with the area name, which also saves time and effort to set the trigger word through a user operation.

Embodiment 4

In this embodiment, an example will be described in which the next candidate is set based on the click history made on the text display area.

Figure 32:
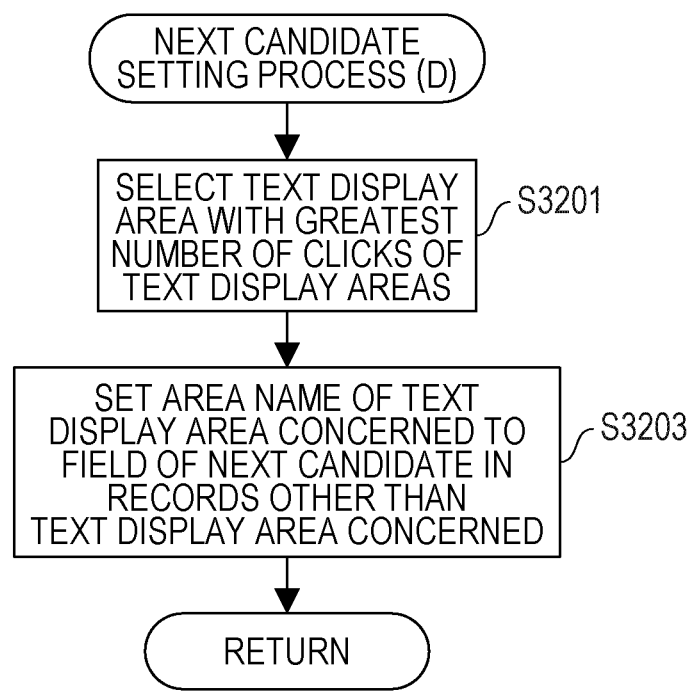
FIG. 32 is a diagram illustrating a next candidate setting process (D) flow.

In the present embodiment, a next candidate setting process (D) is performed instead of the next candidate setting process (A). FIG. 32 illustrates a next candidate setting process (D) flow. The first generation unit 603 selects a text display area with the greatest number of clicks of the text display areas, using the click history storage unit 653 (S3201).

The first generation unit 603 sets an area name of the text display area concerned to the field of next candidate in the records other than the text display area concerned of the records in the property table (S3203). The next candidate setting process (D) ends and the process returns to the first preparation process that is a calling source. The next candidate setting process (D) may be performed along with any one of the next candidate setting process (A) to the next candidate setting process (C).

According to the present embodiment, time and effort to set the next candidate is saved.

Embodiment 5

In this embodiment, an example of setting the trigger word based on the speech content will be described.

Figure 33:
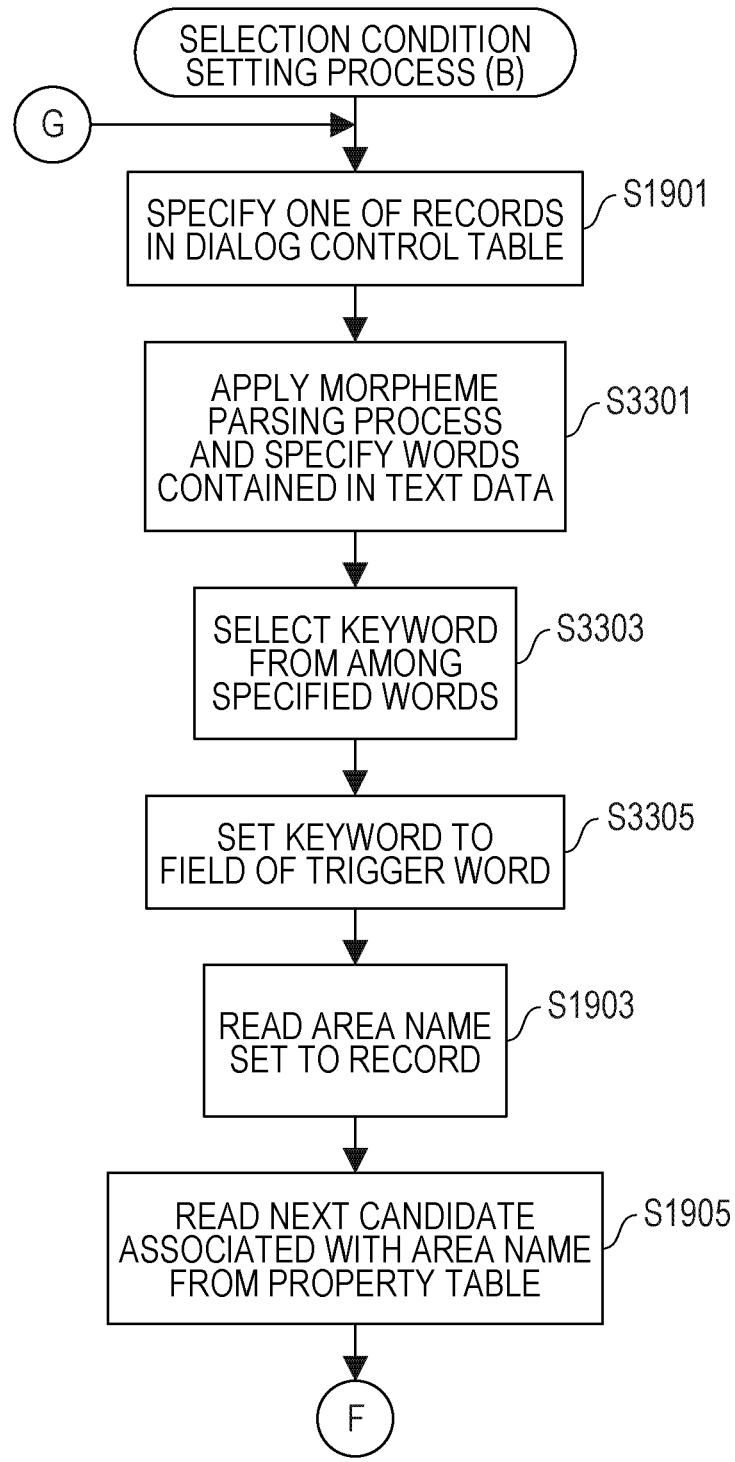
FIG. 33 is a diagram illustrating a selection condition setting process (B) flow.

In the present embodiment, a selection condition setting process (B) is performed instead of the selection condition setting process (A). FIG. 33 illustrates a selection condition setting process (B) flow. The process of S1901 is the same as the case of FIG. 19.

The second generation unit 605 applies the morpheme parsing process and specifies words contained in the text data set to the record specified in S1901 (S3301).

The second generation unit 605 selects a keyword from among the specified words (S3303). For example, the second generation unit 605 selects a word with high feature degree by referring to the word database 649.

The second generation unit 605 sets the keyword to the field of trigger word in the record specified in S1901 (S3305).

The other processes are the same as those in the selection condition setting process (A).

According to the present embodiment, the trigger word is specified based on the speech content, which achieves the setting of the trigger word in conformity with the speech content.

Embodiment 6

In this embodiment, an example will be described in which the text data extracted from the structural elements is divided and the trigger word based on a context relation is set to the divided text data.

FIG. 34 illustrates an example of the dialog control table in the embodiment 6. In this example, it is determined that the text data of the body exceeds a predetermined number of characters. The text data of the body is: "Zoo says that the baby bear has grown to approximately xx cm in length and approximately xxxx g in weight. In the released video, we can see the baby bear held in his mother and thriving. The keeper says, "They are both in good condition."" The text data of the body is then divided into blocks with the number of characters equal to or smaller than the predetermined value: "Zoo says that the baby bear has grown to approximately xx cm in length and approximately xxxx g in weight. In the released video, we can see the baby bear held in his mother and thriving." and "The keeper says, "They are both in good condition."".

Each of the divided blocks, namely, partial text data is dealt with as one piece of speech content, while selection conditions with the context relation of the blocks taken into account are set. For example, if a user speaks "next", the next block is to be read out. Alternatively, if a user speaks "previous", the previous block is to be read out.

Figure 35:
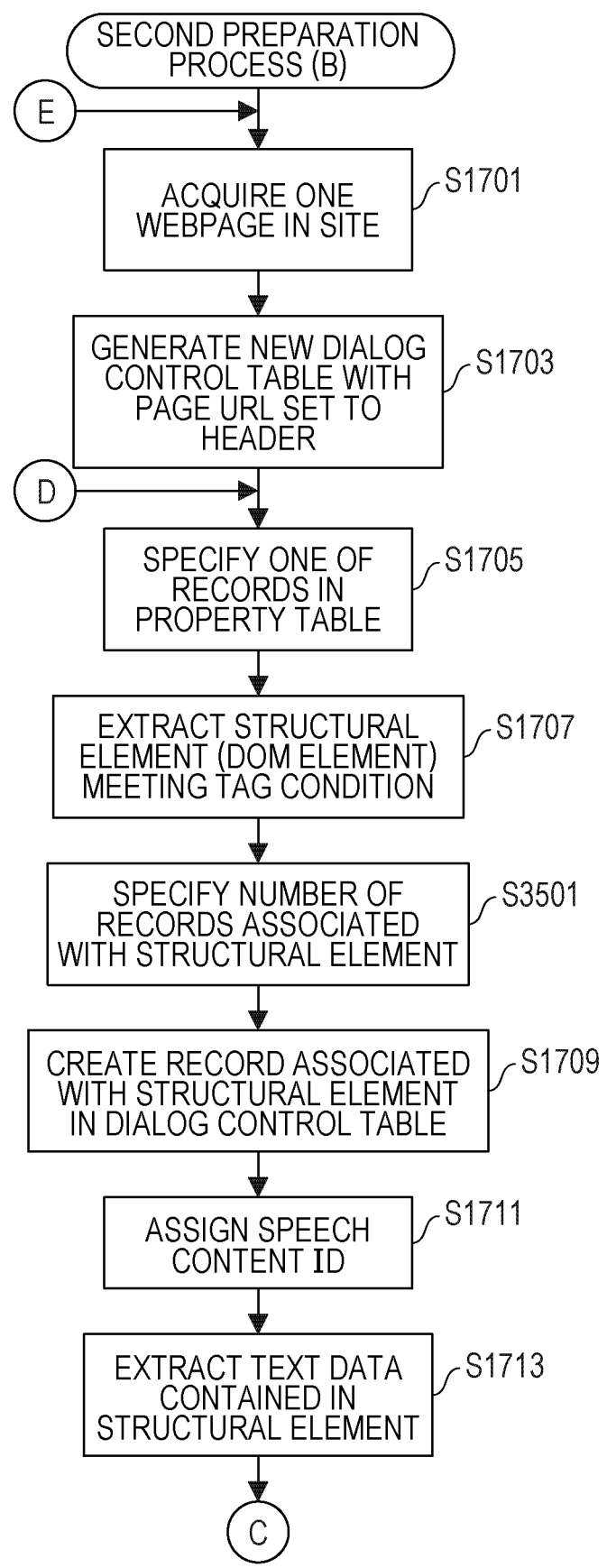
FIG. 35 is a diagram illustrating a second preparation process (B) flow.

In the present embodiment, a second preparation process (B) is performed instead of the second preparation process (A). FIG. 35 illustrates a second preparation process (B) flow. The processes of S1701 to S1707 are the same as the case of FIG. 17.

The second generation unit 605 specifies the number of records associated with the structural element extracted in S1707 (S3501). To be specific, when the number of characters in the text data contained in the structural element exceeds a predetermined value, the second generation unit 605 divides the text data into sentence blocks with the number of characters equal to or smaller than the predetermined value. The second generation unit 605 then designates the number of divided blocks as the number of records.

When the number of records is two or more, the second generation unit 605 creates the number of records in the process of S1709.

When the number of records is two or more, the second generation unit 605 assigns a different speech content ID to each record in the process of S1711.

When the number of records is two or more, the second generation unit 605 assigns a block divided from the extracted text data to each record in the process of S1713.

Figure 36:
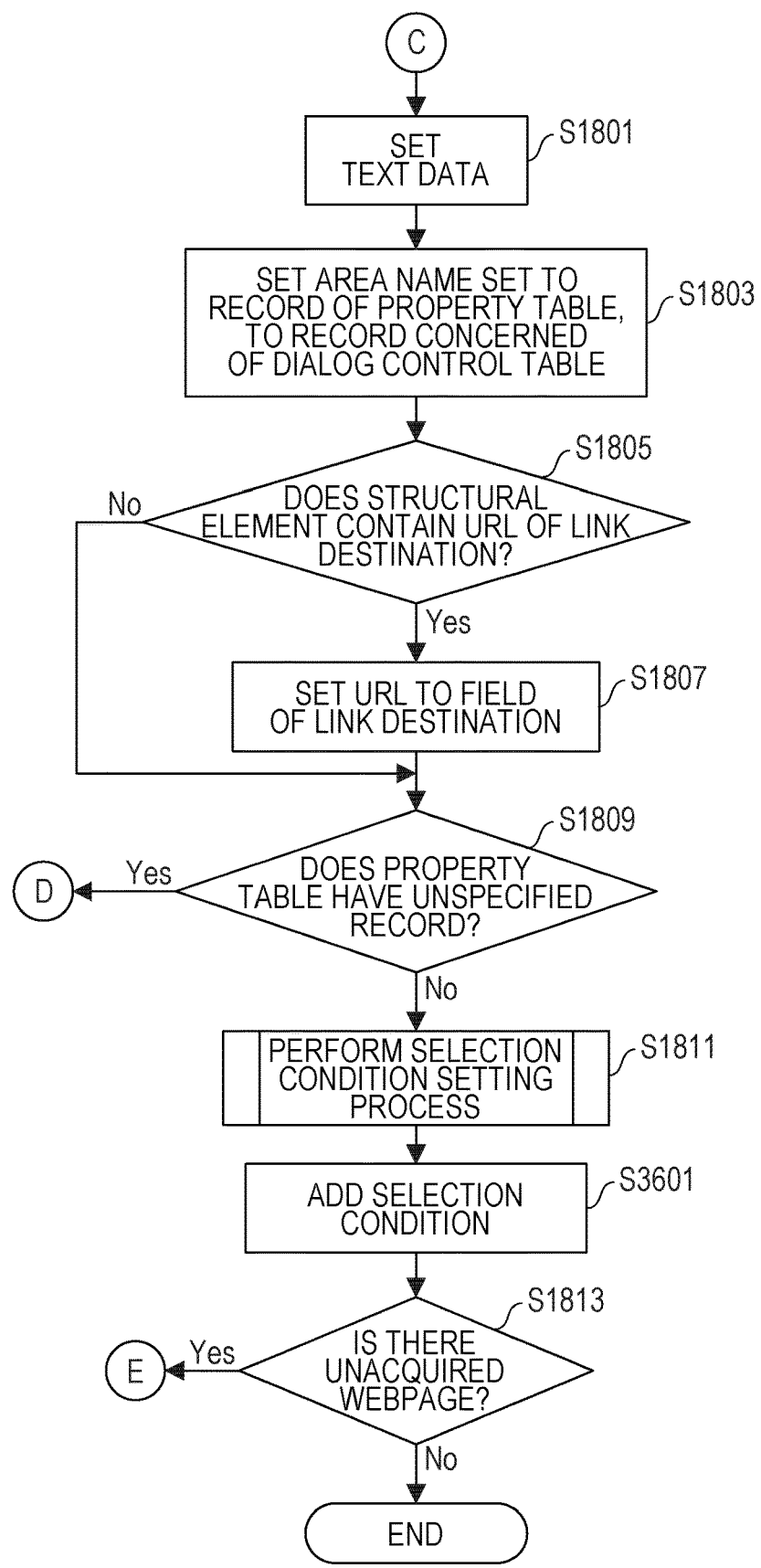
FIG. 36 is a diagram illustrating the second preparation process (B) flow.

The description proceeds to FIG. 36. When the number of records is two or more, the second generation unit 605 sets the assigned block to the field of text data in each record in the process of S1801.

When the number of records is two or more, the second generation unit 605 sets the same area name to each record in the process of S1803. The second generation unit 605 may append a numeral indicating the order of the blocks to the area name.

When the number of records is two or more, the second generation unit 605 sets the same selection condition to each record in the process of S1811.

When the number of records with the same area name is two or more, the second generation unit 605 adds a selection condition (S3601).

Specifically, the second generation unit 605 adds a selection condition for the records other than the last record. A trigger word for the added selection condition is, for example, "next" to be set. To the field of next-selected target, a speech content ID specifying the next record is set. The second generation unit 605 further adds a selection condition for the records other than the first record. A trigger word for the added selection condition is, for example, "previous" to be set. To the field of next-selected target, a speech content ID specifying the previous record is set.

The process of S1813 is the same as the case of FIG. 18.

According to the present embodiment, a step-by-step machine speech of long text is achieved.

Embodiment 7

In this embodiment, an example of acquiring a webpage from a URL of the link destination and generating the dialog control table will be described.

In the present embodiment, a second preparation process (C) is performed instead of the second preparation process (A). In the second preparation process (C), the processes same as those of FIG. 17 are performed first.

Figure 37A:
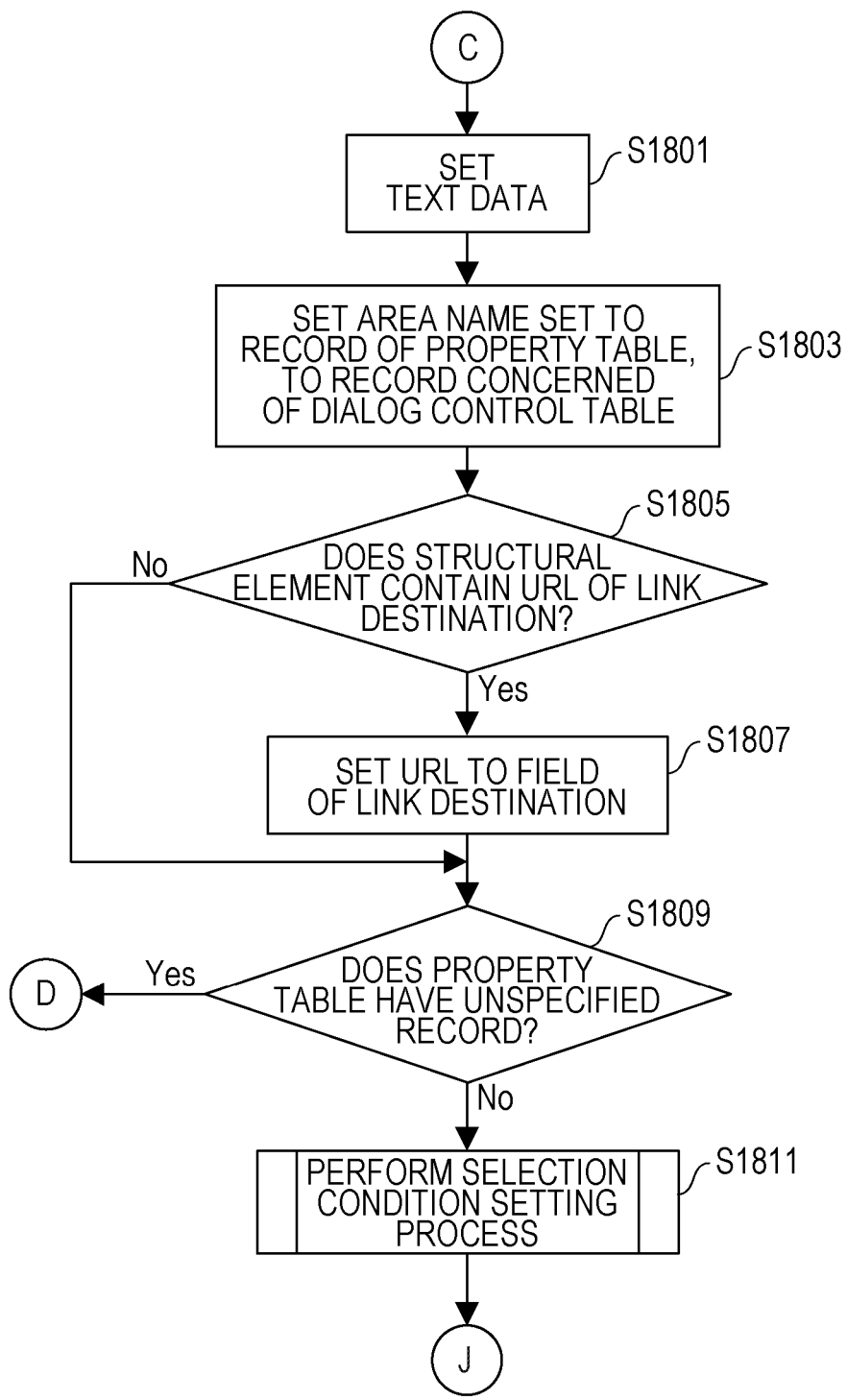
FIG. 37A is a diagram illustrating a second preparation process (C) flow.
Figure 37B:
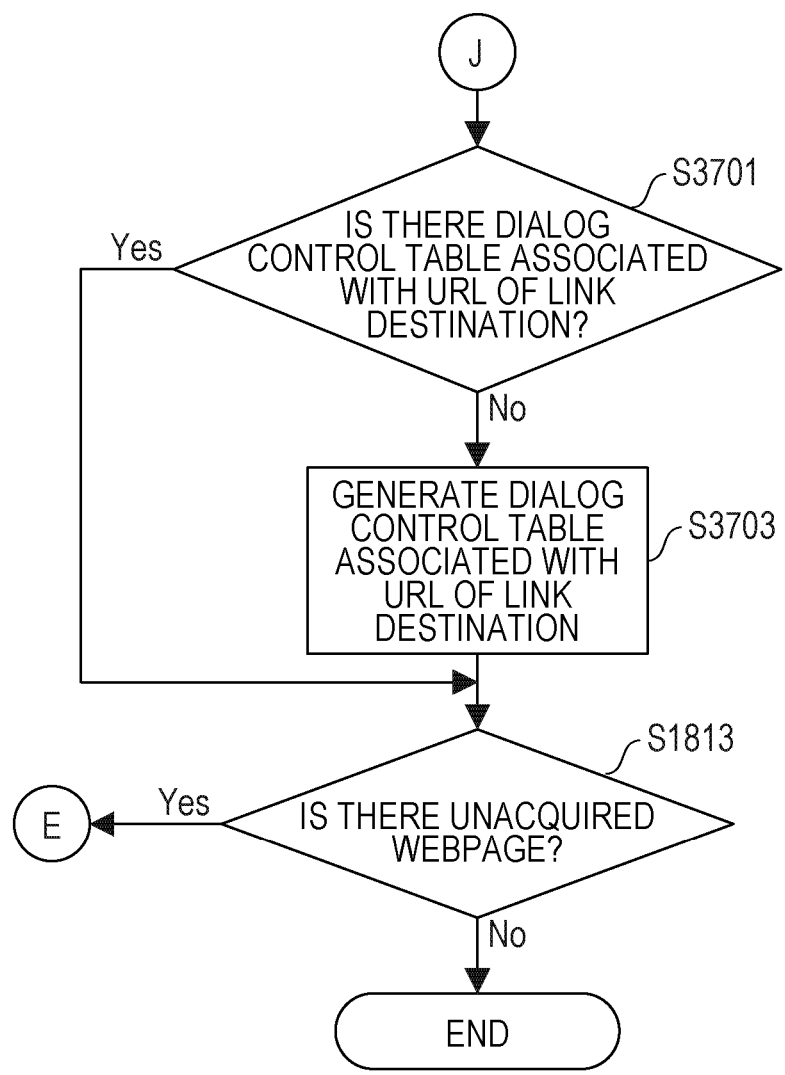
FIG. 37B is a diagram illustrating the second preparation process (C) flow.

The processes of S1801 to S1811 depicted in FIG. 37A are performed next. The processes of S1801 to S1811 are the same as the case of FIG. 18. The process of S1811 ends, and then the process proceeds to a process of S3701 depicted in FIG. 37B via a terminal J.

The second generation unit 605 determines whether there is a dialog control table with the same page URL as the URL of the link destination set in S1807 (S3701). If it is determined that there is a dialog control table with the same page URL as the URL of the link destination, the process proceeds to the process of S1813.

On the other hand, if it is determined that there is no dialog control table with the same page URL as the URL of the link destination, the acquisition unit 601 acquires a webpage from the URL of the link destination, and the second generation unit 605 generates a dialog control table associated with the URL of the link destination (S3703). The process for generating the dialog control table is the same as those of S1703 of FIG. 17 to S1813 of FIG. 18.

According to the present embodiment, the dialog control table relevant to the webpage acquired from the URL of the link destination is prepared, which contributes to topic development in an automatic dialog.

Embodiment 8

In this embodiment, an example of acquiring a webpage from a URL designated by the user terminal 505 and generating a dialog control table will be described.

Figure 38:
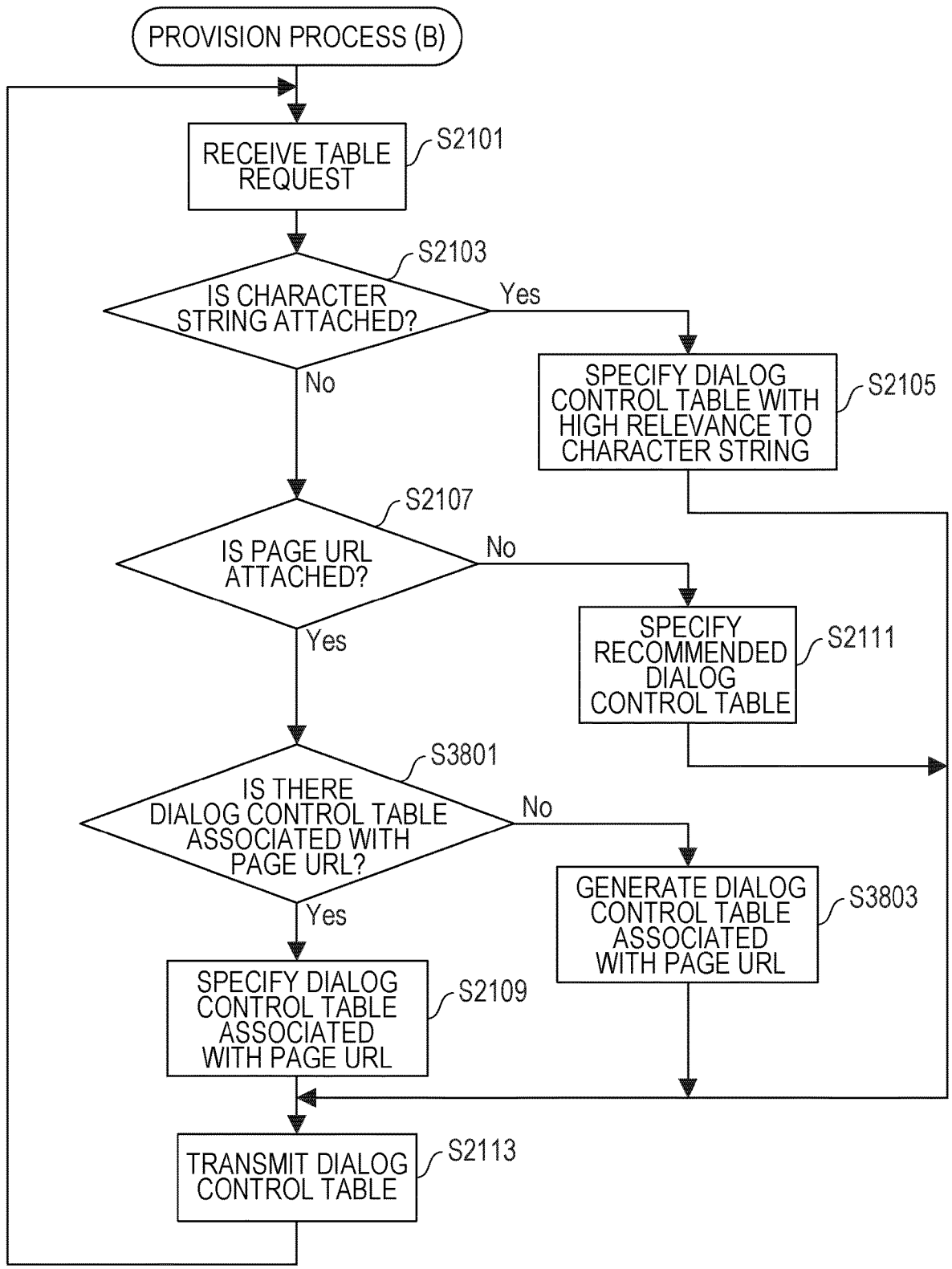
FIG. 38 is a diagram illustrating a provision process (B) flow.

In the present embodiment, a provision process (B) is performed instead of the provision process (A). FIG. 38 illustrates a provision process (B) flow. The processes of S2101 to S2107 are the same as the case of FIG. 21.

In S2107, if determining that the page URL is attached to the table request received in S2101, the specification unit 613 determines whether there is a dialog control table associated with the page URL (S3801). If it is determined that there is a dialog control table associated with the page URL, the process proceeds to the process of S2109. The process of S2109 is the same as the case of FIG. 21.

On the other hand, if it is determined that there is no dialog control table associated with the page URL, the acquisition unit 601 acquires a webpage from the page URL, and the second generation unit 605 generates a dialog control table (S3803). The process for generating the dialog control table is the same as those of S1703 of FIG. 17 to S1813 of FIG. 18. In S2113, the transmission unit 615 transmits the generated dialog control table to the user terminal 505 that is a request source.

The process of S2111 is the same as the case of FIG. 21.

According to the present embodiment, the dialog control table is prepared based on the designated page URL, which contributes to topic development.

Embodiment 9

In this embodiment, an example will be described in which the property table is modified when it is determined whether the generation of the dialog control table fails and then it is determined that the generation of the dialog control table fails.

In the present embodiment, a second preparation process (D) is performed instead of the second preparation process (A). In the second preparation process (D), the processes same as the processes of FIG. 17 are performed first.

Figure 39A:
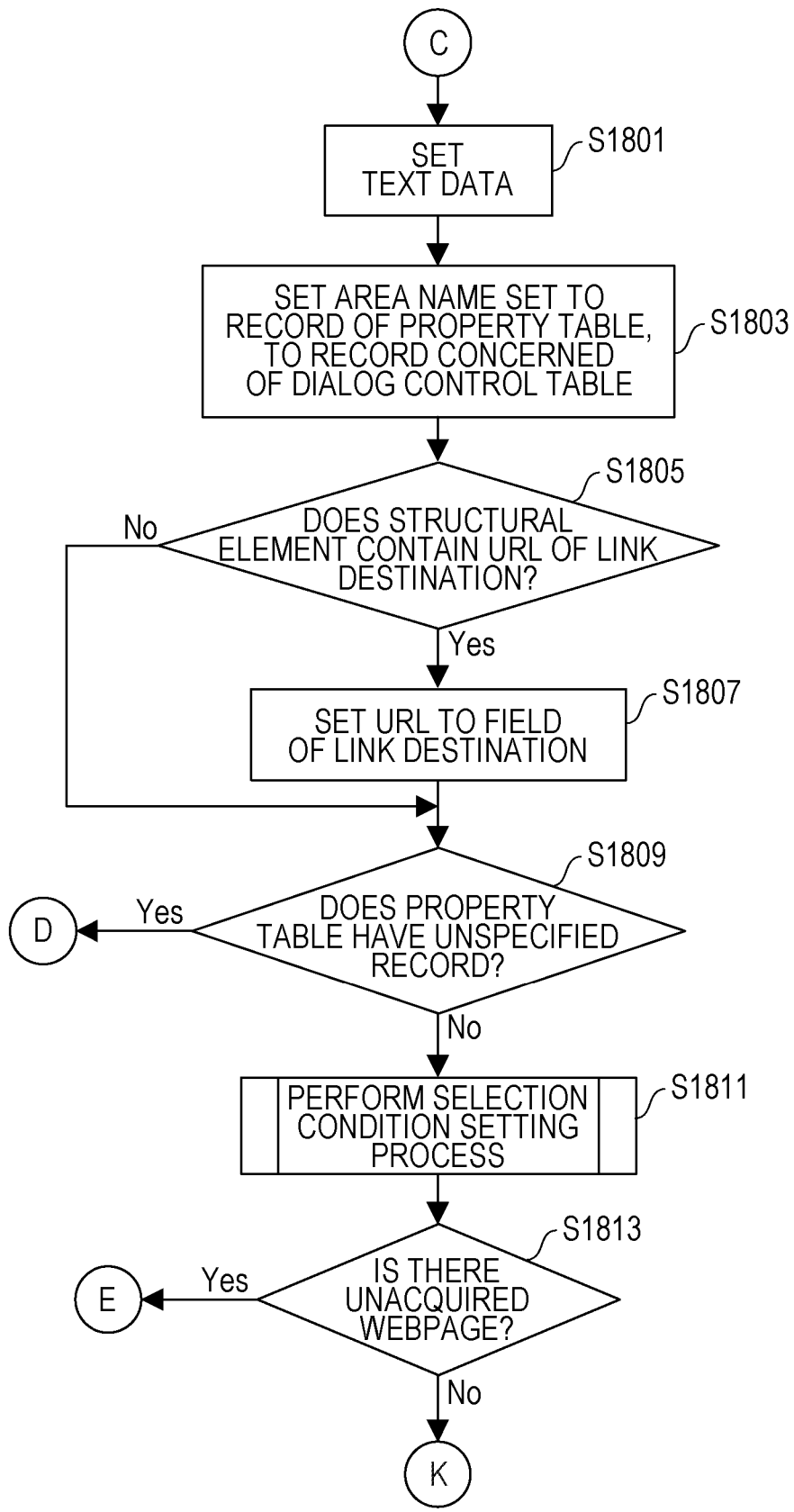
FIG. 39A is a diagram illustrating a second preparation process (D) flow.
Figure 39B:
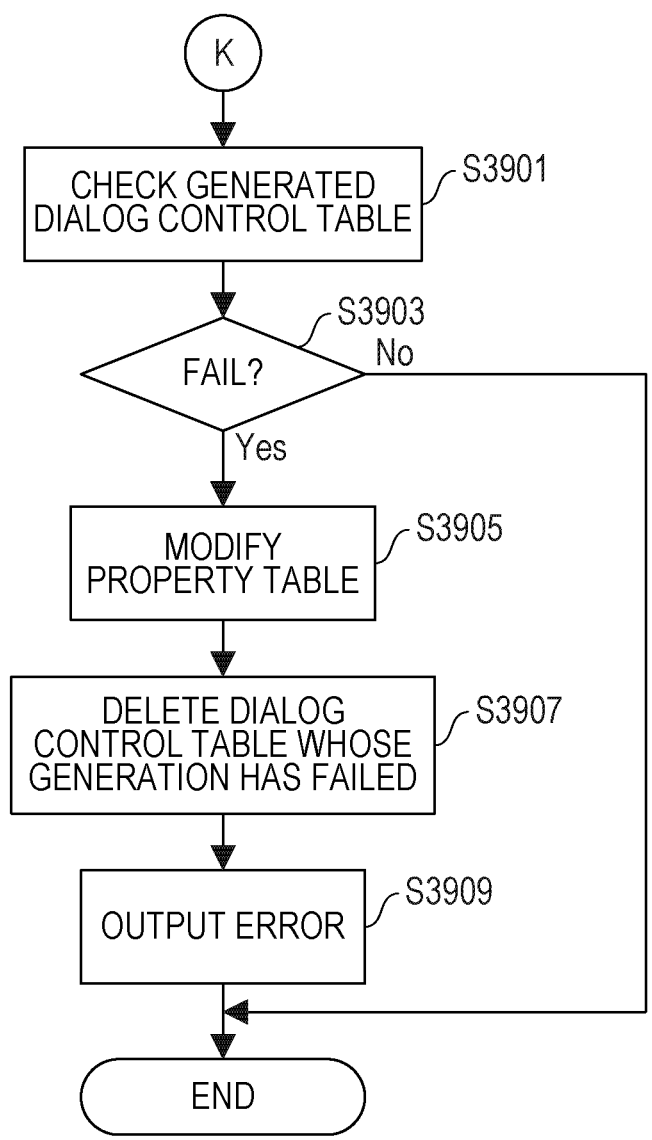
FIG. 39B is a diagram illustrating the second preparation process (D) flow.

The processes of S1801 to S1813 depicted in FIG. 39A are performed next. The processes of S1801 to S1813 are the same as the case of FIG. 18. The process of S1813 ends, and then the process proceeds to a process of S3901 depicted in FIG. 39B via a terminal K.

The verification unit 631 checks the generated dialog control table to determine whether the generation of the dialog control table fails (S3901). For example, the verification unit 631 determines whether the number of characters in the text data set in any of the records in the dialog control table lowers a predetermined value. If determining that the number of characters is equal to or smaller than the predetermined value, the verification unit 631 determines that the generation of the dialog control table fails. On the other hand, if determining that the number of characters is not equal to or smaller than the predetermined value, the verification unit 631 determines that the generation of the dialog control table succeeds.

The modification unit 633 branches the process depending on whether the generation of the dialog control table fails or succeeds (S3903). If the generation of the dialog control table does not fail, the second preparation process (D) directly ends.

On the other hand, if the generation of the dialog control table fails, the modification unit 633 modifies the property table (S3905). If there is a dialog control table associated with the same page URL as the URL of the webpage that lays the base of the dialog control table whose generation failed, it means that the dialog control table has been correctly led for the past webpage, namely, the webpage with a different configuration from the current configuration. The modification unit 633 modifies the property table based on the past dialog control table that has been correctly led.

Specifically, the modification unit 633 specifies a structural element containing text data identical to the text data set to the past dialog control table from among the structural elements of the current webpage. The modification unit 633 then rewrites the tag condition in the past dialog control table to the tag condition specifying the specified current structural element, which enables the property table to be modified to a property table based on the current configuration. Note that this modification is performed on the assumption that only the configuration of the webpage is changed but the displayed text is not changed.

The modification unit 633 deletes the dialog control table whose generation failed (S3907), and outputs an error (S3909). Then, the second preparation process (D) ends. The second preparation process (D) may be automatically performed again when an error is output.

According to the present embodiment, an update on the configuration change of the webpage is achieved.

The dialog server 501 and the user terminal 505 may be an integrated device. In this case, the provision unit 607 of the dialog server 501 and the dialog control unit 2205 of the user terminal 505 may deliver data internally instead of using a network.

The embodiments of the present disclosure have been described above but the present disclosure is not limited to these. For example, the above-described functional block configurations do not coincide with a program module configuration in some cases.

The configurations of the above-described storage areas each are an example and the storage areas are not limited to the above-described configurations. In the process flows, the order of processes may be replaced or multiple processes may be performed in parallel as long as the process result remains unchanged.

The dialog server 501 and the user terminal 505, which are described above, each are a computing device, in which a memory 2501, a CPU 2503, a hard disk drive (HDD) 2505, a display control unit 2507 connected to a display device 2509, a drive device 2513 for a removable disk 2511, an input device 2515, and a communication control unit 2517 for connection to a network are connected with one another through a bus 2519, as illustrated in FIG. 40. An operating system (OS) and an application program that performs the processes in the embodiments are stored in the HDD 2505, and when executed by the CPU 2503, loaded from the HDD 2505 to the memory 2501. The CPU 2503 controls the display control unit 2507, the communication control unit 2517, and the drive device 2513 depending on a process of the application program to cause them to execute a predetermined operation. Data being in processing is stored mainly in the memory 2501 but may be stored in the HDD 2505. In the embodiments discussed herein, the application program that performs the above-described processes is stored in the computer-readable removable disk 2511 to be distributed, and installed in the HDD 2505 from the drive device 2513. The application program may be installed in the HDD 2505 via a network, such as the Internet, and the communication control unit 2517. Such a computing device is organically coordinated with hardware such as the CPU 2503 and the memory 2501, which are described above, and a program such as the OS and the application program to achieve the above-described various functions.

The embodiments described above are summarized as follows.

An information processing device according to the embodiments includes (A) a first generation unit that generates property data with a first context relation set between text display areas contained in a display image of a first webpage, and (B) a second generation unit that generates, based on the property data, dialog control data with a second context relation set between pieces of text extracted from structural elements of text display areas contained in a second webpage.

This achieves easy preparation for an automatic dialog using comparable webpages as an information source.

Further, the first generation unit may set, to the property data, words to be a trigger to apply the first context relation. When an automatically recognized user speech contains the word, the second generation unit may apply the second context relation based on the first context relation and set, to the dialog control data, a condition for selecting a piece of text to be read out next.

This contributes to a machine speech suitable for the interest of a listener.

Further, the first generation unit may set the first context relation in association with names of the text display areas.

This saves time and effort to set the first context relation.

Further, the first generation unit may set the words in association with names of the text display areas.

This saves time and effort to set the words.

Further, the first generation unit may set the first context relation based on histories of user instructions toward the text display areas.

This saves time and effort to set the first context relation.

Further, the second generation unit may specify the words based on the pieces of text extracted from the structural elements.

This enables the words in conformity with the text to be set.

Further, the second generation unit may divide the piece of text extracted from the structural element and set a third context relation between the divided pieces of text.

This achieves a step-by-step machine speech of long text.

Further, the information processing device may include an acquisition unit that acquires the second webpage from a link destination when the link destination is set to the structural element.

This contributes to topic development in an automatic dialog.

Further, the information processing device may include an acquisition unit that acquires the second webpage from a storage location when the dialog control data is requested with the storage location designated.

This contributes to topic development in an automatic dialog.

Further, the information processing device may include a determination unit that determines whether generation of the dialog control data fails. The information processing device may further include a modification unit that modifies the property data if the generation of the dialog control data fails.

This achieves an update on the configuration change of the webpage.

A program that causes a computer to execute the processes performed by the above-described information processing device may be created. The program may be stored in a computer-readable storage medium or storage device such as a flexible disk, a CD-ROM, a magneto-optical disk, a semiconductor memory, and a hard disk. Note that typically, results in the course of processing are temporarily stored in the storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and configured to:
      generate a property table including a plurality of records to represent a first web page based on user input requested from a user and the first web page, the property table including an area name of a display section of a GUI to be displayed by the user terminal, trigger words to activate the automatic dialog with the user, and a next candidate;
      request the user input for generating the property table when there is text or an area within the first webpage that is not associated with a record of the plurality of records, the user input being at least one of the area name and the trigger words corresponding to the text or the area within the first webpage that is not associated with a record of the plurality of records;
      acquire a second webpage based on the first webpage and the content request from the user; and
      generate a dialog control table relating to the second webpage, the dialog control table including the trigger words, speech content ID identifying text to be selected based on the trigger words, and a next selection target for continuing the automatic dialog.

2. The information processing device according to claim 1, wherein the processor sets the first context relation set in association with names of the text display areas.

3. The information processing device according to claim 1, wherein the processor sets the trigger words in association with names of the text display areas.

4. The information processing device according to claim 1, wherein the processor sets the first context relation set based on histories of user instructions toward the text display areas.

5. The information processing device according to claim 1, wherein the processor specifies the trigger words based on the pieces of text extracted from the structural elements.

6. The information processing device according to claim 1, wherein the processor divides the piece of text extracted from the structural elements and sets a third context relation between the divided pieces of text.

7. The information processing device according to claim 1, wherein the processor is further configured to acquire the second webpage from a link destination when the link destination is set to the structural elements.

8. The information processing device according to claim 1, wherein the processor is further configured to acquire the second webpage from a storage location when the dialog control data is requested with the storage location designated.

9. The information processing device according to claim 1, wherein the processor is further configured to:
determine whether generation of the dialog control data fails, and
modify the property data if the generation of the dialog control data fails.

10. A computer-implemented method comprising:
generating a property table including a plurality of records to represent a first web page based on user input requested from a user and the first web page, the property table including an area name of a display section of a GUI to be displayed by the user terminal, trigger words to activate the automatic dialog with the user, and a next candidate;
requesting the user input for generating the property table when there is text or an area within the first webpage that is not associated with a record of the plurality of records, the user input being at least one of the area name and the trigger words corresponding to the text or the area within the first webpage that is not associated with a record of the plurality of records;
acquiring a second webpage based on the first webpage and the content request from the user; and
generating a dialog control table relating to the second webpage, the dialog control table including the trigger words, speech content ID identifying text to be selected based on the trigger words, and a next selection target for continuing the automatic dialog.

11. An automatic dialog system comprising:
a user terminal configured to receive a content request from a user;
a web server configured to provide access to a plurality of web pages; and
dialog server connected to the user terminal and web server via a network, the dialog server conducting an automatic dialog with an operator of the user terminal, the dialog server configured to:
acquire a first webpage based on the content request from the user;
generate a property table including a plurality of records to represent the first web page based on user input requested from a user and the first web page, the property table including an area name of a display section of a GUI to be displayed by the user terminal, trigger words to activate the automatic dialog with the user, and a next candidate;
request the user input for generating the property table when there is text or an area within the first webpage that is not associated with a record of the plurality of records, the user input being at least one of the area name and the trigger words corresponding to the text or the area within the first webpage that is not associated with a record of the plurality of records;
acquire a second webpage based on the first webpage and the content request from the user; and
generate a dialog control table relating to the second webpage, the dialog control table including the trigger words, speech content ID identifying text to be selected based on the trigger words, and a next selection target for continuing the automatic dialog.

12. The automatic dialog system according to claim 11, wherein the automatic dialog includes voice recognition and voice synthesis.

* * * * *